(12) United States Patent
Montero SanJuan et al.

(10) Patent No.: US 8,019,472 B2
(45) Date of Patent: Sep. 13, 2011

(54) CRAWLER ROBOT EQUIPPED WITH A WORK UNIT, AND GOVERNING EQUIPMENT FOR SUCH CRAWLER ROBOTS

(75) Inventors: Pedro Montero SanJuan, Getafe (ES); José Luis Ramallo Gutierrez, Madrid (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 653 days.

(21) Appl. No.: 11/797,470

(22) Filed: May 3, 2007

(65) Prior Publication Data
US 2008/0077276 A1 Mar. 27, 2008

(30) Foreign Application Priority Data
Jul. 31, 2006 (ES) .................................. 200602075

(51) Int. Cl.
*G06F 19/00* (2011.01)
(52) U.S. Cl. ............................ 700/245; 180/8.1; 180/8.5
(58) Field of Classification Search .................. 700/245; 180/8.1, 8.5, 8.6, 164
See application file for complete search history.

(56) References Cited

U.S. PATENT DOCUMENTS

| | | | |
|---|---|---|---|
| 4,321,976 A | 3/1982 | Reinke et al. | |
| 4,657,104 A * | 4/1987 | Holland | 180/211 |
| 4,674,949 A | 6/1987 | Kroczynski | |
| 5,351,626 A * | 10/1994 | Yanagisawa | 180/8.6 |
| 5,468,099 A * | 11/1995 | Wheetley et al. | 408/1 R |
| 6,105,695 A * | 8/2000 | Bar-Cohen et al. | 180/8.5 |
| 2001/0013434 A1* | 8/2001 | Hopkins | 180/7.1 |
| 2003/0053901 A1* | 3/2003 | Roy et al. | 414/735 |
| 2003/0208302 A1* | 11/2003 | Lemelson et al. | 700/245 |

FOREIGN PATENT DOCUMENTS

| | | |
|---|---|---|
| FR | 2 659 875 | 9/1991 |
| WO | 94/26540 | 11/1994 |
| WO | 03/0019231 | 3/2003 |

\* cited by examiner

*Primary Examiner* — John Q Nguyen
*Assistant Examiner* — Rodney King
(74) *Attorney, Agent, or Firm* — Wenderoth, Lind & Ponack, L.L.P.

(57) ABSTRACT

The robot comprises a chassis (1) with a first set of legs (2a, 2b) with suction pads (6) on tilting supports (7) mounted in a linearly displaceable manner with regard to the chassis and a second set of legs (4) with suction pads (17) mounted in a rotary manner with regard to the chassis. Certain control means are adapted in order to control the functioning of said first and second sets of legs in a coordinated manner for displacing the chassis in any direction on the work surface (S). It includes support feet (9) and a system for leveling the chassis in relation to a curvature of the work surface. Fitted on the chassis is a work unit (44) with a head (19) for working on the work surface via an opening (12) in the chassis. It includes means for displacing said head along three axes and pivoting the head on two axes with respect to the chassis.

25 Claims, 15 Drawing Sheets

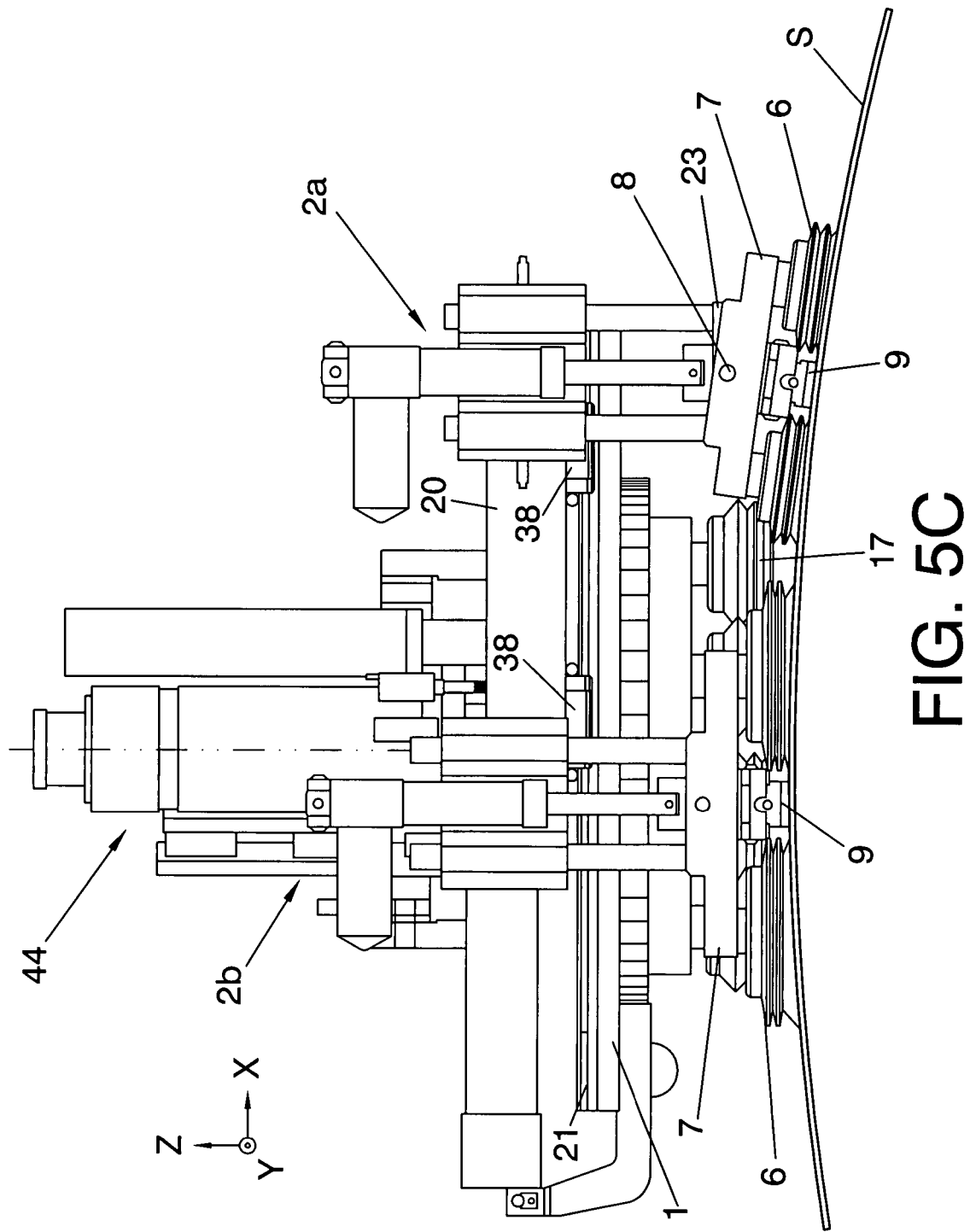

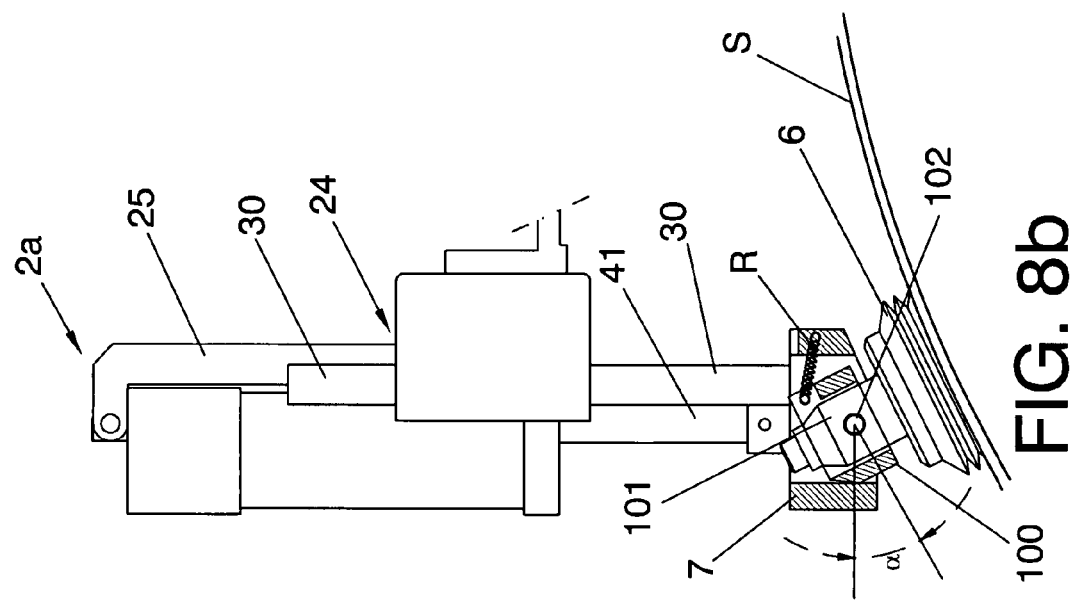
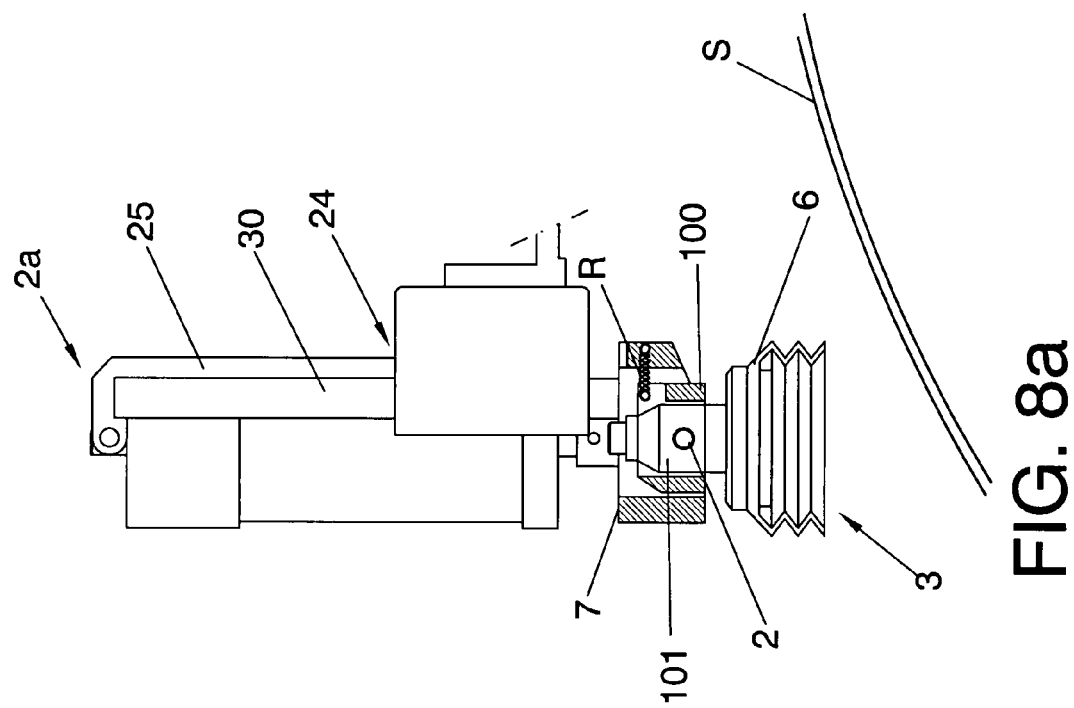

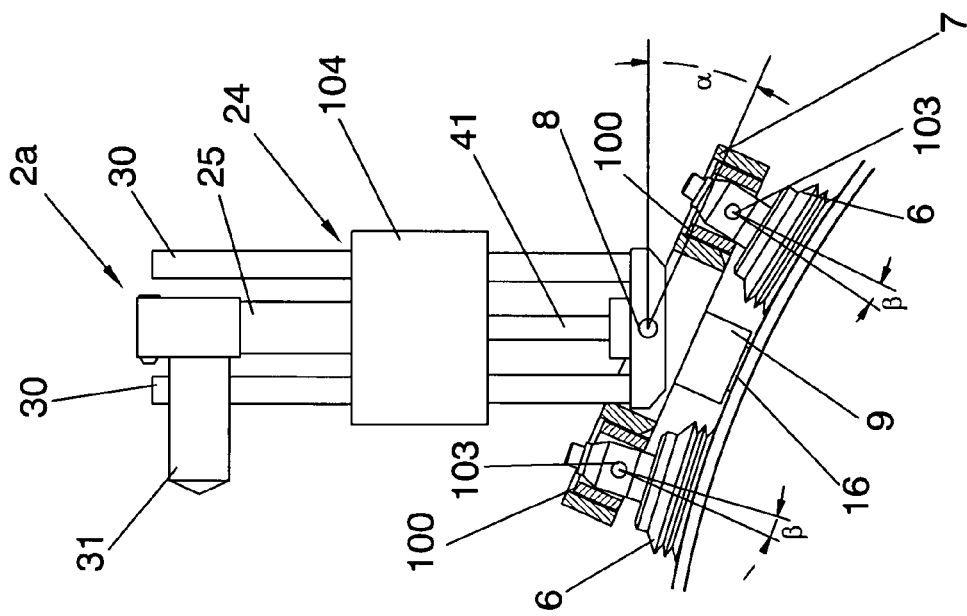
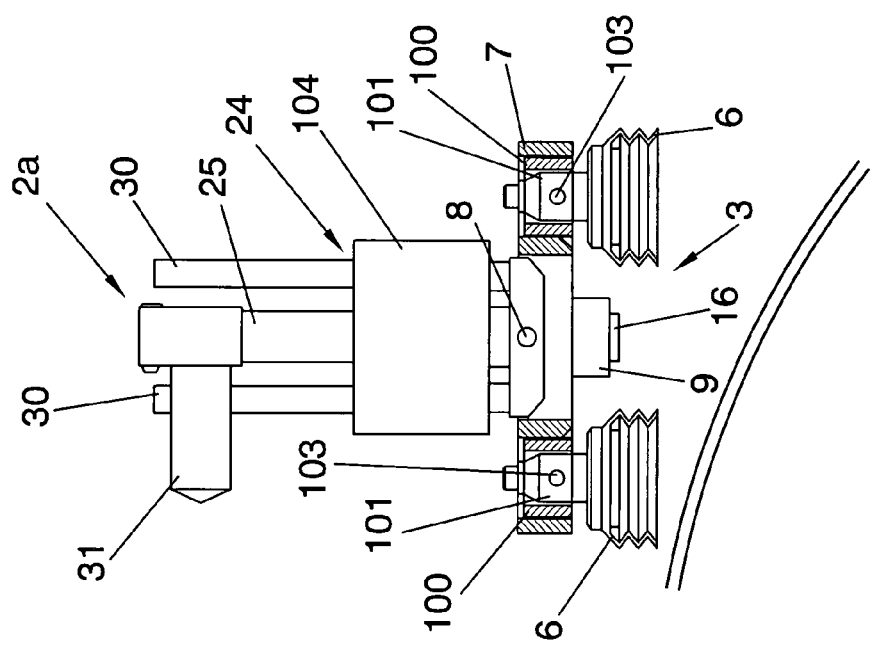
FIG. 9b
FIG. 9a

CRAWLER ROBOT EQUIPPED WITH A
WORK UNIT, AND GOVERNING
EQUIPMENT FOR SUCH CRAWLER ROBOTS

FIELD OF THE ART

The present invention relates to a crawler robot equipped with a work unit, said robot being capable of displacing itself over a smooth curved surface, positioning itself in different predetermined places of work of that surface and performing a job in one or more operation sites in each of those places of work. The present invention also concerns governing equipment for such robots which includes at least one first robot adapted for performing one or more stages preceding said work in the predetermined sites and a second robot for afterwards performing one or more stages following the work in the same predetermined sites, both the first and the second robot being governed by certain control means for being displaced and working in a coordinated fashion on the work surface.

In general, the crawler robot and the equipment for the crawler robots of the present invention have application in any sector of industry and in particular in the field of aeronautics.

STATE OF THE ART

In various fields of the art there exist a need to have crawler robots capable of crawling on smooth surfaces that are steeply inclined, vertical or even overhanging. Numerous robots are known provided with suction pads adapted for crawling, for example on the glass facades of buildings with the aim of carrying out cleaning or similar tasks. Nevertheless, when the work surfaces are curved, the displacement of such robots over them presents a considerably greater problem.

The application for invention patent WO 94/26540 describes a robot provided with continuous rolling bands of the "caterpillar" type fitted with suction pads adapted so that it can couple itself to the work surface as the continuous bands roll. This crawler robot is intended for carrying out non-destructive inspections and cleaning operations on the external surfaces of aircraft. The external surfaces of an aircraft are curved and usually have two or more directions of curvature. In order to carry out turns, the vehicles equipped with continuous bands generally have to move the two bands at different speeds or in opposite directions, and the continuous bands slide over the floor during the turn. A drawback presented by robots equipped with continuous bands with suction pads attached to them is the difficulty of making turns on account of the resistance which opposes the suction pads in their sliding when they are coupled to the surface.

U.S. Pat. No. 6,105,695 describes a crawler robot intended for tasks of detecting imperfections and for inspection of repairs to aircraft, though it is also applicable to the handling of hazardous materials, such as toxins and explosives. This robot incorporates a system of locomotion by steps consisting of a platform, a first set of legs mounted in a linearly displaceable manner with respect to the platform and provided with a first suction coupling device adapted for intermittently coupling said first set of legs to the work surface, and a second set of legs mounted in a rotary and linearly displaceable manner with respect to the platform and provided with a second suction coupling device adapted for intermittently coupling said second set of legs to the work surface. Each leg of the first and second set of legs is mounted so that it can be extended towards the work surface and be retracted with regard to it. The robot includes means of actuation for moving the sets of legs with regard to the platform and means of activation connected to a source of suction for selectively activating said first and second suction coupling devices, each of which consists of one or more suction pads. The robot includes control means adapted for controlling the functioning of the means of activation and of the means of actuation in a coordinated manner in order to displace the platform in any direction on the work surface. The system of locomotion is as follows. When the suction pads of, let us assume, the first set of legs are coupled to the work surface, the second set of legs are decoupled, retracted and linearly displaced with regard to the platform. The second set of legs then extend and their suction pads are coupled to the work surface. Afterwards, the suction pads of the first set of legs are decoupled, the first set of legs are retracted and linearly displaced with regard to the platform, and then the first set of legs are extended and their suction pads are coupled to the work surface, thereby completing one step and leaving the robot ready for taking the next step which is a repetition of the previous one. Turns are made by rotating the second set of legs with respect to the platform when the suction pads of a single set of legs are coupled to the work surface.

The system of locomotion by steps described the cited U.S. Pat. No. 6,105,695 has a precedent in a "stepper" platform useable for displacing large loads along a flat floor, of U.S. Pat. No. 4,321,976.

Nevertheless, the cited U.S. Pat. No. 6,105,695, which constitutes the nearest state of the art, does not describe any specific system for leveling the platform of the robot in relation to a work surface that is curved, nor for precisely positioning a work unit carried by the robot in relation to an operation site in a place of work on that curved work surface.

In the aeronautical construction industry there exists the need to have robots capable of crawling on surfaces of a fuselage or part of a fuselage, or other parts of an aircraft under construction in order to carry out jobs on them. One of the jobs that are habitually carried out consists of joining one or more partially superimposed panels by means of riveting, which entails first of all drilling holes, possibly reamed and countersunk, and then inserting and fixing rivets in the holes. This work requires having at least one drill head and a head for locating and fixing of rivets. At the moment of carrying out the work, these heads have to be as perpendicular as possible to the site of the work surface where it is required to perform the operation. On a work surface curved in one, two or more directions, the position of the work heads must be perpendicular to a plane tangent to the work surface at the operation site.

The aim of the present invention is to contribute to satisfying the said need of the aeronautical construction industry, and also other needs in the field of aeronautics and other fields where jobs need to be carried out in places that are difficult of access or in hazardous environments.

DESCRIPTION OF THE INVENTION

In accordance with an initial aspect, the present invention contributes a crawler robot equipped with a work unit of the type that consists of a chassis, which on an imaginary basis is referenced with three coordinate axes X, Y, Z where the X axis is aligned with a direction of advance of the said chassis and the Z axis is directed towards a work surface on which the robot is displaced; a first set of legs mounted in a linearly displaceable manner in the direction of the X axis with respect to the chassis and provided with a first suction coupling device adapted for intermittently coupling said first set of legs to the work surface, each leg of the first set of legs being mounted in a manner that is extensible in the direction of the Z axis towards the work surface, and retractable from it, with regard to the chassis, and a second set of legs mounted in a rotary manner around a Z axis with respect to the chassis and provided with a second suction coupling device adapted for intermittently coupling said second set of legs to the work surface. The robot includes some first and second means of activation connected to a source of suction for selectively activating said first and second suction coupling devices, some first means of actuation for linearly displacing the first set of legs with respect to the chassis; some second means of actuation for individually actuating an extension or retraction of each leg of the first set of legs with respect to the chassis; and some third means of actuation for causing the second set of legs to rotate with respect to the chassis. The robot includes some control means adapted for controlling the functioning of said first and second means of activation and of said first, second and third means of actuation in a coordinated manner in order to displace the chassis in any direction on the work surface. The crawler robot of the present invention is characterized in that each of the said first suction coupling devices consists of at least two suction pads mounted on a tilting support joined in an articulated fashion to one end of the corresponding leg of the first set of legs in such a way that it can freely tilt with regard to a shaft parallel to the Y axis; joined to each tilting support is a foot located between said two suction pads and designed and arranged for resting on the work surface when the two suction pads are coupled to that work surface. At least one first and second sensor elements are respectively provided at some first and second separated points of the chassis in order to detect the distance in the direction of the Z axis from each of the said first and second points of the chassis to the work surface and to send representative signals of those distances to said control means. Fitted to the chassis is a mobile support device which supports a work unit provided with a head arranged for working on the work surface via an opening existing in the chassis, said mobile support device including means of guiding and means of actuation in order to displace at least the said head in the directions of the three coordinate axes X, Y, Z and to pivot the head around two axes X, Y within the opening.

This construction permits the robot to be displaced on the work surface in any direction in order to go to and position itself in a predetermined place of work, level the chassis in relation to the work surface and secure itself in that place of work with the chassis leveled by coupling the suction pads of all the legs to the work surface. Once the robot is positioned, leveled and secured in the place of work on the work surface, the mobile support device can then position the head precisely in order to carry out the required job or some stages of the job required in an operation site included in the place of work. The robot can possibly act in various operation sites included in the same place of work simply by displacing and/or pivoting the head with respect to the chassis without any need to move the chassis in relation to the work surface.

In order to guide the robot in its displacements on the work surface, fitted in the chassis and/or in the mobile support device which supports the work unit is a receiver-emitter in communication with various emitter "satellites" located, for example, inside a bay and forming part of a indoor global positioning system (Indoor GPS). The said receiver-emitter is adapted for receiving signals coming from the emitter "satellites" and sending certain representative signals of the position of the receiver-emitter in relation to said indoor global positioning system to said control means. The control means effect a guiding of the displacements of the robot on the work surface depending on the position signals received from the receiver-emitter. In addition or alternatively, provided on the work surface are a plurality of marks and fitted on the chassis, and/or on the mobile support device supporting the work unit is a detection device for those marks in communication with said control means for following the marks on the work surface. The marks can be, for example, optical marks or magnetic marks, among others, and the detection device can comprise a system of artificial vision or magnetic detectors, among others.

In an example of embodiment, the robot is connected with various sources of supply and/or remote control devices via an umbilical line, though the possibility is not discarded of the robot being completely autonomous, for which it would be equipped with power supply batteries, suction generating equipment and wireless communication means.

With the aim of the robot being better adapted to circulating firmly on a curved work surface with the greatest degree of securing of the suction pads, certain improvements are furthermore proposed in the attachment mechanisms of those suction pads, which are attached in an articulated fashion to said tilting support of each of the said first suction coupling devices, so that they can tilt freely and independently with respect to the tilting support, with at least a first degree of freedom around a first shaft.

Said suction pads are attached in an articulated fashion to said first support of each of said first suction coupling devices, so that they can tilt freely and independently with respect to the tilting support, with at least a second degree of freedom around a second shaft.

The second shaft is perpendicular to the first shaft, which is parallel to the Y axis, when the suction pad with which it is associated is in a non-tilting position with respect to the second shaft.

Each of the suction pads is fixed via its upper end to a support appendage, part of which is located inserted in a frame introduced in a cavity of said tilting support, and joined to said frame by means of said first shaft, which emerges from said support piece and is arranged perpendicularly and fixed via its ends to respective walls of said frame, in order to permit the tilting of the support piece and, with this, the tilting of the suction pad, with respect to the frame around the first shaft.

Said frame is attached to said tilting support by means of said second shaft, which is arranged perpendicularly and fixed via its ends to respective walls of said tilting support which demarcate said cavity, in such a way that permits the tilting of the frame and, with this, the tilting of the suction pad, with respect to the support member around the second shaft.

Provision has also been made for at least one spring element fixed via one end to the frame and via the other to the wall demarcating the tilting support, so that the spring element can act against the tilting movement in one direction of the frame with regard to the second shaft.

With regard to the second set of legs, which include a plurality of suction pads of said second suction coupling devices, said suction pads are fitted in pairs in various blocks joined to said rotary annular support.

Each one of said blocks comprises a first piece firmly attached to the rotary annular support, and a second piece, to which are attached two of those suction pads, being attached in an articulated fashion to said first piece, in such a way that it can tilt freely with respect to a third shaft contained in a plane parallel to that of the rotary annular support.

Moreover, each of the said blocks comprises two third pieces, each of them attached to an upper end of a respective suction pad via their upper end, each pair of said third pieces being attached in an articulated fashion, freely and independently with respect to the second piece, with at least a first degree of freedom around a fourth shaft perpendicular to said third shaft.

Each of those suction pads is attached in an articulated fashion to one of the third pieces via a fifth shaft perpendicular to the fourth shaft.

The arrangement that is described facilitates the articulation of the suction pads of the first and second set of legs, so that they can be located facing the work surface, with which greater efficiency is achieved in displacing the robot.

In accordance with a second aspect, the present invention provides a team of crawler robots, where said team includes a plurality of crawler robots equipped with a work unit in accordance with the first aspect of the invention. The team of crawler robots of the present invention is characterised in that it comprises at least one first robot equipped with a first work unit adapted for effecting one or more preceding stages of a job and a second robot equipped with a second work unit adapted for effecting one or more subsequent stages of said job, said control means being adapted for displacing said first robot as far as a predetermined place of work, or consecutively to various predetermined places of work on the work surface and to effect in one or more operation sites included in each of said places of work the said one or more preceding stages and for subsequently displacing said second robot as far as the same place of work or as far as the same places of work and to effect in said one or more operation sites included in each of said places of work the said one or more subsequent stages.

One advantage of the team of crawler robots of the present invention is that each robot in the team can carry a head that is highly specialized in one of the various tasks or stages making up a job. Moreover, with this construction, each individual robot of the team is lighter than would be a single robot provided with several heads. Obviously, lightness is a characteristic highly appreciated in a crawler robot fitted with devices for coupling to the work surfaces by suction. Advantageously, all the robots of the team can be equal in terms of chassis, locomotion system, mobile support system for the work unit, communications system, guiding system, control means, etc., and differ solely in terms of the characteristics of the work unit installed in each one. In fact, the different work units can be interchangeable among the various robots, and there can even be a small number of robots and a greater number of work units for different jobs, with just the units required for carrying out the different stages of a job in particular being fitted to the robots as necessary.

By way of example, a typical job in the aeronautical construction industry consists of joining two or more partially superimposed panels by means of rivets, in order to form the fuselage or other parts of an aircraft. In order to carry out this work of joining panels by means of rivets, the team of the present invention consists of two crawler robots. A first robot carries a first work unit equipped with a head for drilling, reaming and countersinking, and a second robot carries a second work unit equipped with a head for positioning and fixing the rivets. The first work unit of the first robot preferably also incorporates a suction device for shavings in order to suck up the shavings produced by the said drilling, reaming and countersinking head, and a device for detecting the thickness of the material to drill and/or detect a distance between the drilling, reaming and countersinking head and the work surface at the operation site in order to determine how far the head has to advance against the work surface in order to effect each operation. Preferably, the second work unit of the second robot also incorporates a sealing material application device for applying sealing material to the hole made by the first robot prior to locating a rivet in that hole.

BRIEF DESCRIPTION OF THE FIGURES

The above characteristics and advantages and others will be more fully understood on the basis of the following detailed description of some examples of embodiment with reference to the attached drawings, in which:

FIGS. 5A to 5G are views in lateral elevation of the crawler robot of FIG. 1 in different positions which illustrate certain locomotion and leveling movements;

FIG. 8a is a front elevation view in partial cross-section of a first set of legs of the robot proposed by the present invention for an example of embodiment, in a position retractable in the direction of the Z axis;

FIG. 8b is a view in partial cross-section of a first set of legs of the robot proposed by the present invention for the same example of embodiment as for FIG. 8a, but in a position in which the suction pads are extended and coupled to a curved work surface;

FIG. 9a is a front view in partial cross-section of the first set of legs illustrated by FIG. 8a;

FIG. 9b is another lateral elevation view in partial cross-section of the first set of legs illustrated by FIG. 8b;

DETAILED DESCRIPTION OF AN EXAMPLE OF EMBODIMENT

Figure 1:
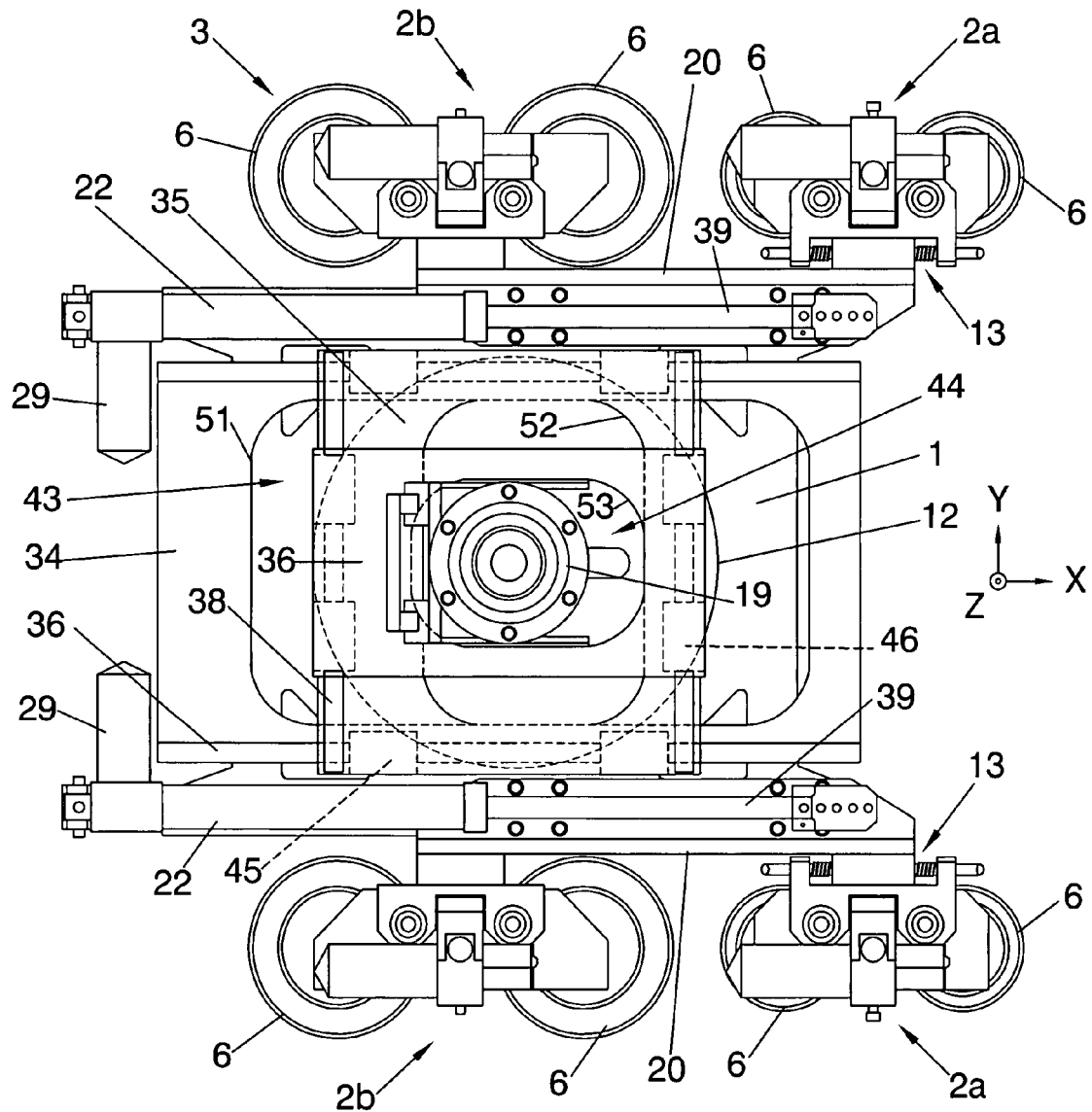
FIG. 1 is a plan view of a crawler robot equipped with a work unit in accordance with the example of embodiment of the present invention.

Making reference to the figures, according to an example of embodiment of the present invention the crawler robot comprises a chassis 1 equipped with a locomotion system for being displaced on a work surface S (FIGS. 5 to 7) and adapted for carrying a work unit 44 provided with a head 19 ready for working in that work surface S. With regard to the said chassis 1, and solely for the purpose of facilitating the following description, an imaginary system of references has been established based on three coordinate axes X, Y, Z, where the X axis is aligned with a direction of advance of the said chassis 1 and the Z axis is directed towards a work surface S on which the robot is displaced. It has to be stated that the said coordinate axes X, Y, Z are associated exclusively with the chassis 1 and they change their position together with the chassis 1. If the crawler robot is placed on a flat work surface, the X and Y axes would be parallel to that flat work surface and the Z axis would be perpendicular to it. Nevertheless, FIGS. 5A to 5G show the crawler robot arranged on a curved work surface S with the aim of illustrating the adaptations which the robot incorporates for displacing and working on a curved surface. Although for greater simplicity of the drawing, the work surface S that is illustrated is curved in one direction, the crawler robot of the present invention is adapted for likewise being displaced on surfaces curved in multiple directions, such as for example the surfaces found in fuselages and other parts of aircraft. Given that the locomotion system of the crawler robot of the present invention includes, as will be seen further below, certain suction coupling devices based on suction pads for being secured to the work surface, no matter what its orientation might be, the work surface S therefore has to be substantially smooth.

Figure 2:
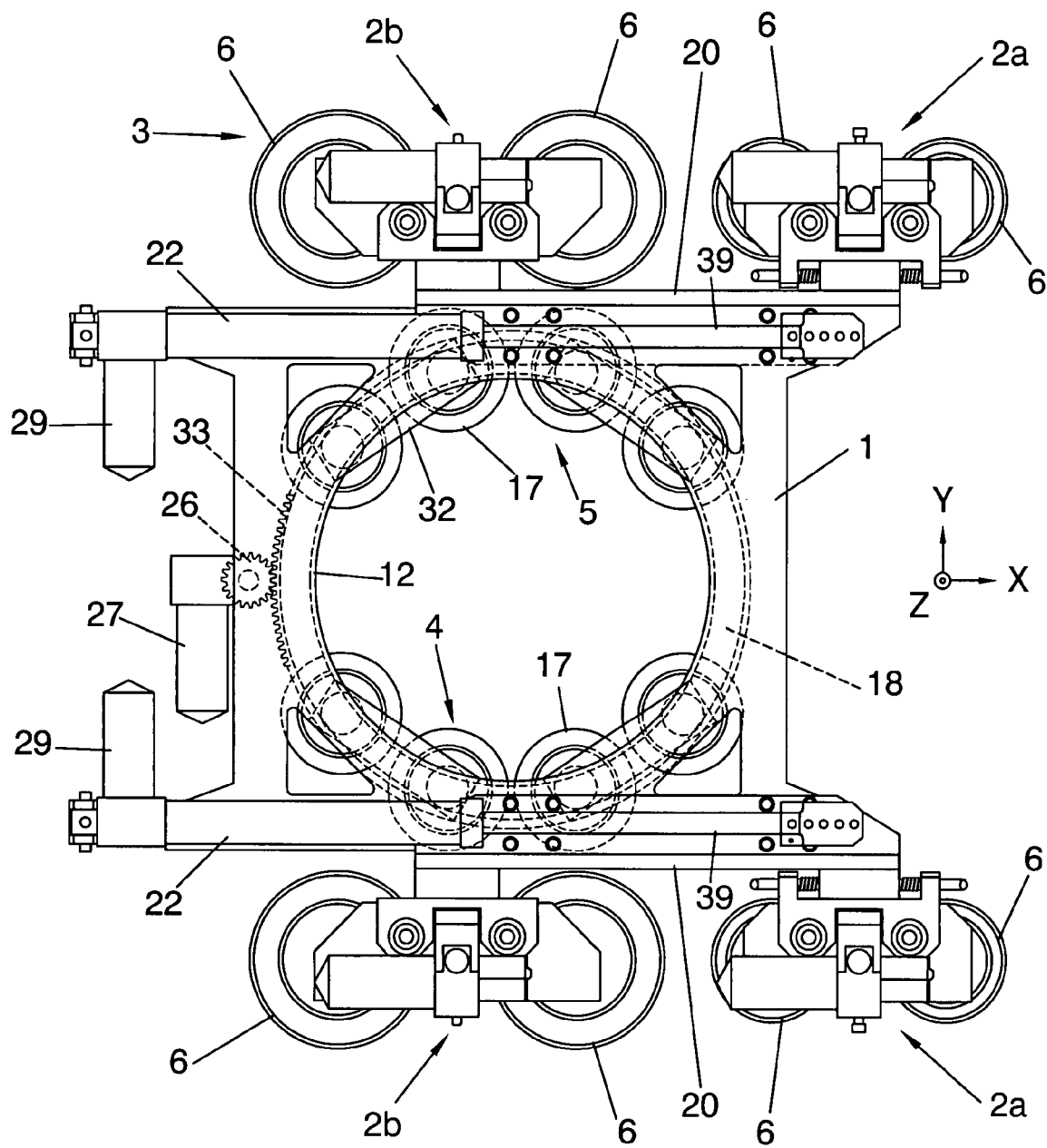
FIG. 2 is a plan view of the crawler robot of FIG. 1 without the work unit in order to better show the structure of the chassis and the locomotion system.

As shown better in FIG. 2, the chassis 1 is in the form of an approximately rectangular plate provided with a wide opening 12 in its middle part. Provided on two opposite sides of the chassis 1 is a first set of legs 2a, 2b, which include a subset of front legs 2a and a subset of rear legs 2b. Provided around the said opening 12 is a second set of legs 4. The said first set of legs 2a, 2b is mounted in a linearly displaceable manner in the direction of the X axis with respect to the chassis 1 and each leg 2a, 2b of the first set of legs 2a, 2b is mounted in a manner that is extensible and retractable in the direction of the Z axis with regard to the chassis 1. The second set of legs 4 is mounted in a rotary manner around an axis parallel with the Z axis with respect to the chassis 1. The first and second set of legs 2a, 2b and 4 are respectively provided with a first and second suction coupling device 3, 5 adapted for intermittently coupling said first and second set of legs 2a, 2b and 4 to the work surface S.

The subset of front legs 2a comprises two legs, one on each side of the chassis 1 and the subset of rear legs 2b comprises another two legs, one on each side of the chassis 1. The front legs 2a and the rear legs 2b located on the same side of the chassis 1 are mounted on a sliding support 20 coupled to the chassis 1 by means of a linear guide device 21 arranged in the direction of the X axis (FIGS. 3 and 5A to 5G). Each sliding support 20 is joined to a pair of runners 28 coupled to the corresponding linear guide device 21 and connected to a linear actuator 22. In the example of embodiment that is illustrated, the said runners 28 are recirculating ball skates and the linear actuators 22 are ball spindles actuated by respective electric servomotors 29 in order to extend or retract some rods 39 (FIGS. 1 and 2). With this construction the front and rear legs 2a, 2b located on the same side of the chassis 1 can be jointly displaced with respect to the chassis 1 by virtue of activating the corresponding electric servomotor 29 and, in general, the two electric servomotors 29 are controlled by some control means such that the four legs 2a, 2b are jointly displaced with respect to the chassis 1 as if the two sliding supports 20 were joined. Obviously, a single sliding support on which the four legs 2a, 2b were mounted would be an equivalent construction.

The said first suction coupling device 3 associated with the first set of legs 2a, 2b comprises at least two suction pads 6 for each of the front and rear legs 2a, 2b. Although, for greater clarity, FIG. 3 shows one of the front legs 2a enlarged, it has to be borne in mind that the construction of the rear legs 2b is substantially the same as that of the front legs 2a.

Figure 3:
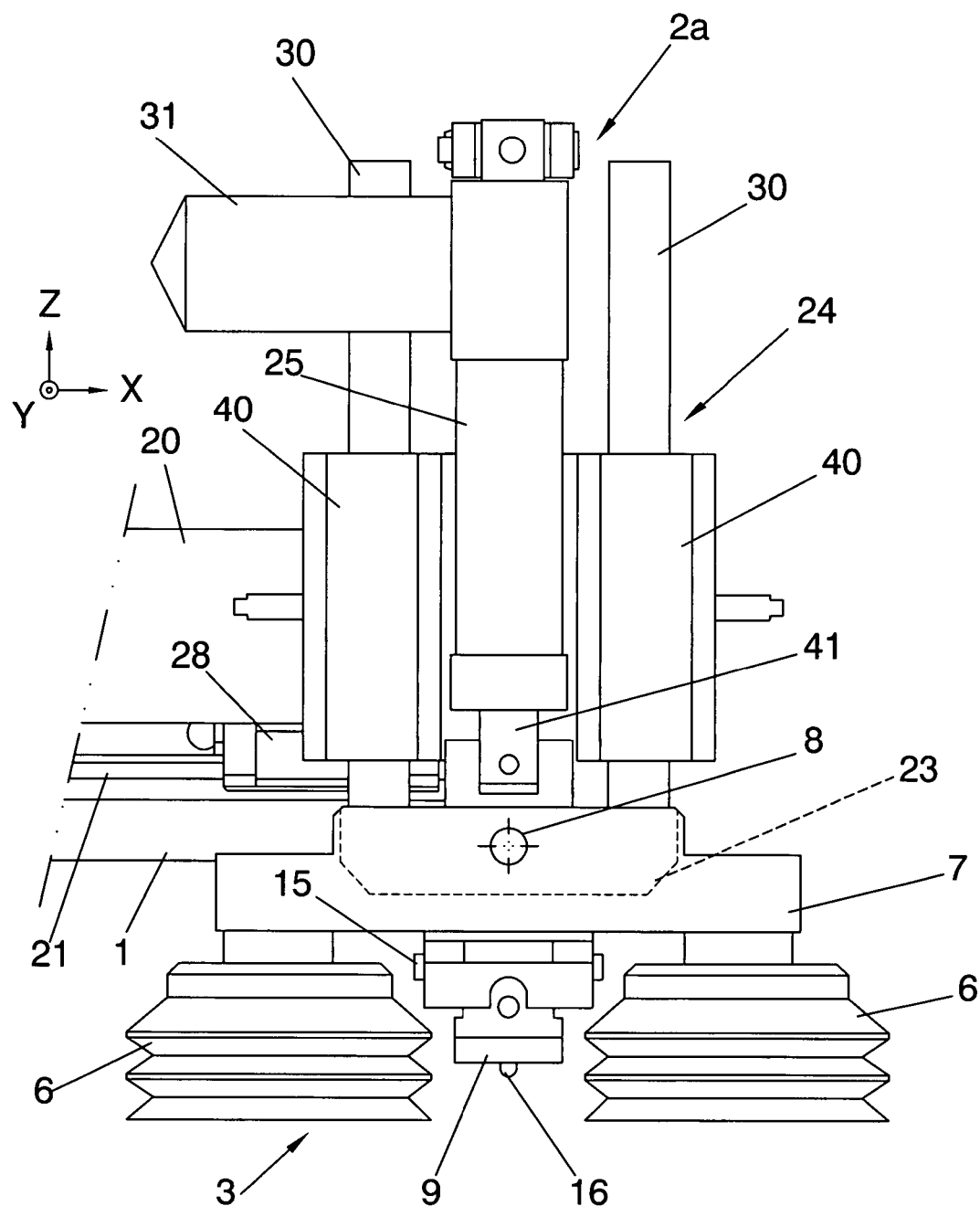
FIG. 3 is an enlarged view of a detail in lateral elevation of a leg provided with a suction coupling device.

As can be appreciated from FIG. 3, each of the front and rear legs 2a, 2b comprises a mobile support 23 (shown with broken lines in FIG. 3) at its end, coupled to the chassis 1 by means of a linear guide device 24 arranged in the direction of the Z axis and connected to a linear actuator 25. The corresponding two suction pads 6 are mounted on a tilting support 7 and attached in an articulated fashion to said mobile support 23 by means of a shaft 8 parallel to the XY axis, in such a way that the tilting support 7 can tilt freely with respect to said shaft 8 parallel to the Y axis (for example, through an angle α as can be seen in FIG. 9b). In the example of embodiment that is illustrated, each linear guide device 24 comprises a set of guide hoses 40 fixed to the sliding support 20 and some respective guide columns 30 fixed to the mobile support 23 and inserted in a sliding fashion in those guide hoses 40. The linear actuator 25 comprises a ball spindle actuated by control means for extending or retracting a rod 41. The four electric servomotors 31 can be activated independently under the control of the control means in order to extend the suction pads 6 of each leg towards the work surface S or to retract them, and the two suction pads 6 of each front and rear leg 2a, 2b automatically adapt themselves to the curvature of the work surface S by virtue of the free rotation of the tilting support 7 around the shaft 8.

Each of the front and rear legs 2a, 2b includes a foot 9 attached to the corresponding tilting support 7 by means of an articulation around a shaft 15 parallel to the X axis (FIG. 3). The said foot 9 is located between the two suction pads 6 of the leg and designed and arranged for resting on the work surface S when the two suction pads 6 of the leg are in contact and coupled to the work surface S (FIGS. 5B-5F). Each one of the said feet 9 carries a contact sensor 16, for example, in the form of a micro-switch provided with a button capable of being pressed by the work surface S when the foot 9 makes contact with the work surface S and of sending the control means a signal representing the existence or not of contact between the foot 9 and the work surface S.

Figure 4:
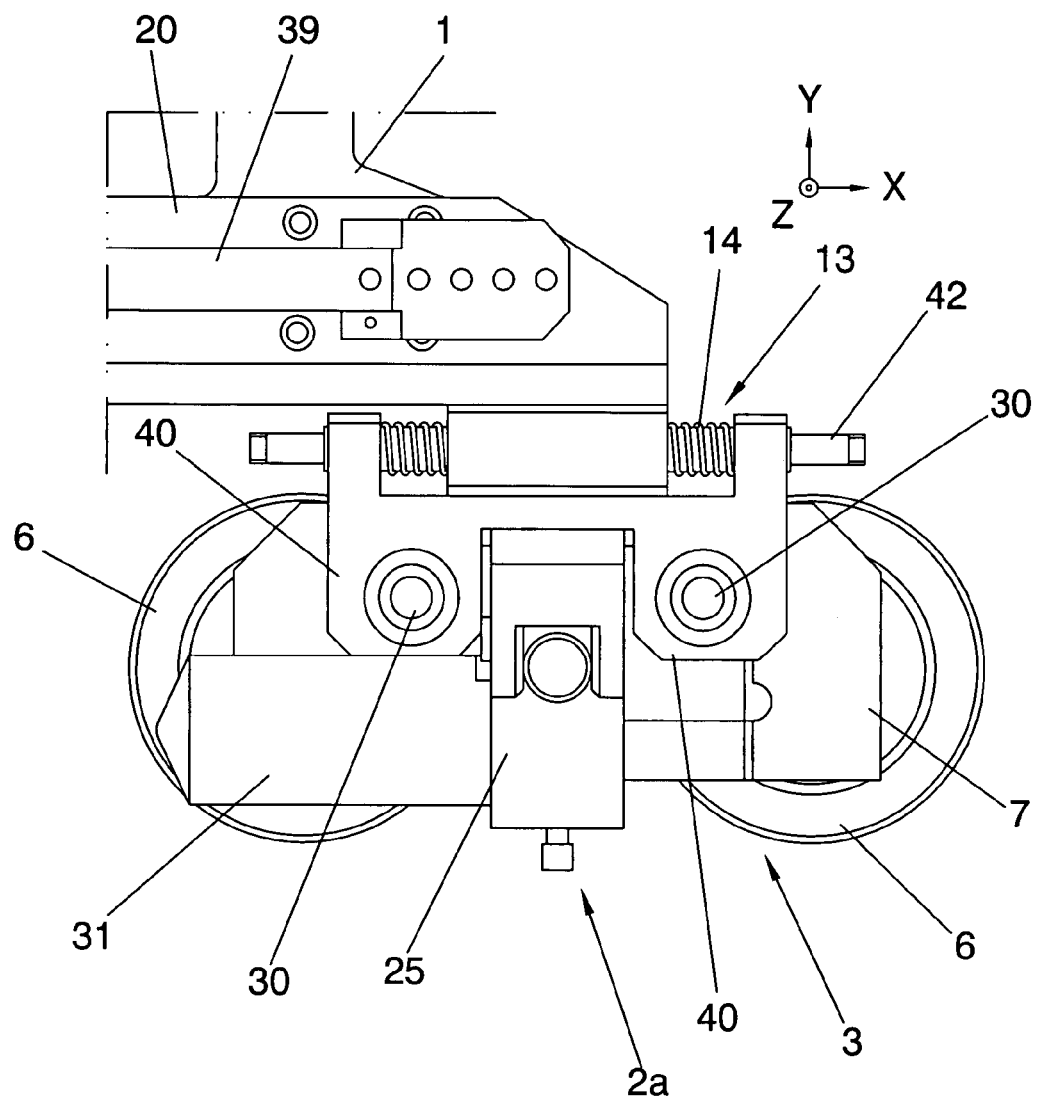
FIG. 4 is an enlarged view of a detail in plan illustrating the assembly of a leg.

Moreover, the front legs 2a are mounted on respective guide devices 13 (best shown in FIG. 4) for permitting linear displacement of each front leg 2a in the direction of the X axis with respect to the corresponding sliding support 20, and consequently with respect to the corresponding rear leg 2b fixed to the same sliding support 20. The guide device 13 includes a bar 42 attached to the sliding support 20 and inserted in a sliding fashion in some holes provided in the structure of the front leg 2a. Some elastic members 14 are arranged around the bar 42 in order to push each leg 2a in opposite directions towards a middle zone of said guide device 13. The said displacements of the legs 2a on their guide devices 13 are effected freely against the force of said elastic members 14.

Referring again to FIG. 2, the second suction coupling device 5 associated with the second set of legs 4 comprises a plurality of suction pads 17 fitted in pairs in various blocks 32 joined to a rotary annular support (shown with broken lines in FIG. 2), joined to the chassis 1 by means of a rotary guide device (not shown), such as for example a ball or roller bearing of large diameter and small transverse cross-section. The rotary annular support 18 is connected to an electric servomotor 27 controlled by the control means for causing the second set of legs 4 to rotate with respect to the chassis 1 around an axis parallel to the Z axis under the control of the control means. In the example of embodiment that is illustrated, the rotary annular support 18 is associated with a toothed crown 33 engaged with a toothed wheel 26 (diagrammatically illustrated in FIG. 2 with broken lines) coupled to an outlet shaft from the said electric servomotor 27 or from a reducer coupled to the electric servomotor 27. The rotary annular support 18 and said rotary guide device have respective central openings dimensioned and arranged in order to house inside them the opening 12 existing in the chassis 1. Note that the legs of the second set of legs 4 are not provided with the possibility of displacement in the direction of the Z axis with respect to the chassis 1. In practice, the legs of the second set of legs 4 can be separated from the support surface S by an extension of the legs of the first set of legs 2a, 2b, capable of sufficiently separating the chassis 1 from the work surface S, as will be explained in further detail below.

All the suction pads 6 and 17 forming part of the first and second suction coupling device 3, 5, respectively, are connected to a source of suction via a system of ducts and pipes (not shown), and the crawler robot includes some first and second means of activation, such as for example a set of valves (not shown), associated with said system of ducts and pipes connected to said suction system in order to selectively and intermittently activate and deactivate the first and second suction coupling device 3, 5 under the control of the control means. So, the control means are capable of controlling the functioning of the electric servomotors 27, 29 and 31 and of said first and second means of activation of the suction pads 6, 17 in a coordinated fashion in order to displace the chassis 1 in any direction on the work surface S by means of a locomotion technique that will be described further below in relation to FIGS. 5A to 5G. Preferably, the source of suction, the power supply source, at least part of the control means and other supply sources related to the work unit 44 are located in a place away from the robot and connected to it via an umbilical line. Nevertheless, provision is made for the robot to be able to be completely autonomous by means of incorporating power supply batteries, suction generating equipment and wireless communication means into the robot.

Installed in the chassis 1, or in a mobile support device 43 supporting the said work unit 44, or in both places, is a device for detection of marks in communication with said control means in order to follow certain marks previously provided on the work surface S. The marks can be, for example, optical marks or magnetic marks, among others, and the detection device can consist of artificial vision or magnetic detectors, among others, capable of detecting the marks and sending signals representing the position of the robot in relation to the marks to the control means, which are programmed so as to order any necessary course corrections for directing the robot to certain predetermined work sites on the support surface S depending on the signals received from the detection device for the marks. Moreover, installed in the chassis 1 and/or in said mobile support device 43 supporting the said work unit 44, or in both places, is a receiver-emitter (not shown) in communication with an indoor global positioning system (Indoor GPS). This receiver-emitter is adapted for sending signals representing the position of the receiver-emitter in relation to said indoor global positioning system for guiding the displacements of the chassis 1 on the work surface S.

The detection device for marks and the indoor global positioning system cooperate in guiding the robot and its positioning in different places of work. Nevertheless, the detection device for marks and the indoor global positioning system do not provide sufficient precision for effecting the works with the precision that is required in certain predetermined operation sites. In order to fine-tune the precision in the positioning, the crawler robot of the present invention incorporates the said mobile support device 43 for supporting the work unit 44.

Figures 6, 7:
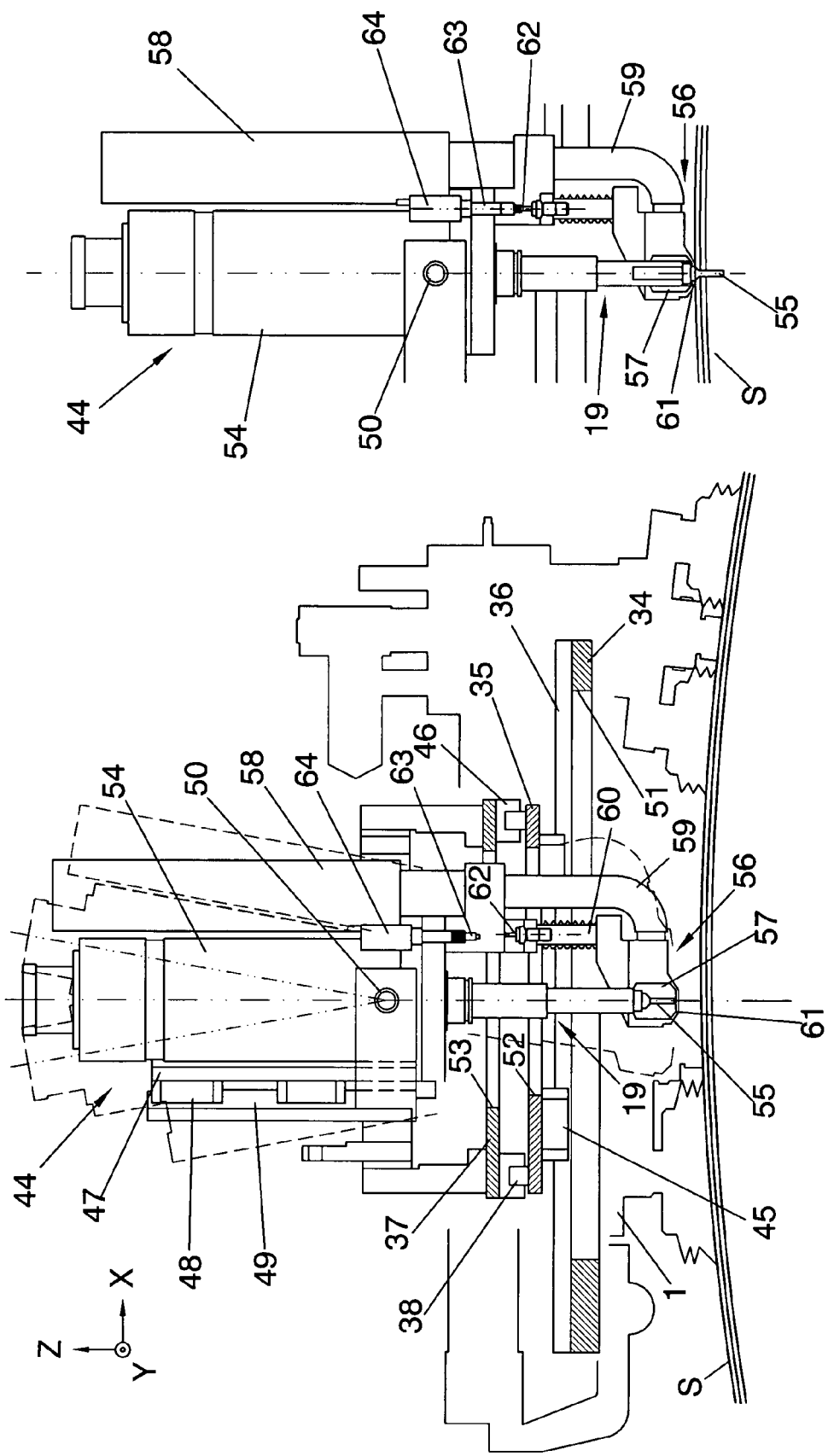
FIG. 6 is a diagrammatic view in transverse cross-section showing the crawler robot on the point of performing a work operation.
FIG. 7 is a diagrammatic view in transverse cross-section showing the crawler robot performing a work operation.

As shown in FIGS. 1 and 6, the mobile support unit 43 on which the work unit 44 is supported is installed on the chassis 1 in such a way that the head is ready for working on the work surface S via the said opening 12 existing in the chassis 1. This mobile support device 43 includes a base 34 adapted for being fixed to the chassis 1. Said base 34 carries some linear guide means 36 arranged in the direction of the X axis. A first trolley 35 is provided with some runners 45 coupled in sliding fashion to said linear guide means 36 attached to the base 34. This first trolley carries some linear guide means 38 arranged in the direction of the Y axis. A second trolley 37 is provided with some runners 46 coupled in sliding fashion to said linear guide means 38 attached to the first trolley 35. Some means of actuation based on electric servomotors (not shown) are connected to the first and second trolley 35, 37 for displacing the head 19 in the directions of the X and Y axes within the opening 12.

The head 19 is mounted on a support 47 provided in some runners 48 coupled in sliding fashion in some guides 49 fixed to the second trolley 37 and arranged in a direction parallel to the Z axis, or in a direction which, when the head 19 is in a position perpendicular to the chassis 1, is parallel or aligned with the Z axis. With this, the head 19 can make work displacements towards the work surface S or move away from it by the actuation of a corresponding electric servomotor (not shown) under the control of the control means. Moreover, the head 19 is mounted on the second trolley 37 in such a way that it can pivot around two shafts parallel to the X, Y axes within the opening 12 by the actuation of some electric servomotors (not shown) under the control of the control means. In FIG. 6 just one of those shafts parallel to the X, Y axes is visible, specifically shaft 50 parallel to the Y axis.

The base 34 and the first and second trolley 35, 37 are provided with respective openings 51, 52, 53 mutually superimposed and superimposed on the opening 12 of the chassis 1, and are arranged and dimensioned in order to permit certain displacements of the head 19 in the directions of the X, Y axes within the opening 12 that are sufficiently large for permitting works to be carried out in one or more different points or operations sites on the work surface S without the need to make displacements of the chassis 1 in relation to the work surface S once the robot has been provided and immobilized in a place of work. In an example of embodiment of the crawler robot of the present invention like that shown in the figures, the mobile support device 43 and its means of actuation are adapted for displacing the head 19 up to 300 mm in the X direction and up to 150 mm in the Y direction in relation to the chassis 1, and in order to position a work axis of the head 19 in relation to the work surface S with a precision of ±0.1 mm or greater in the directions of the X, Y, Z axes and for inclining said work axis of the head 19 with respect to the Z axis in relation to the chassis 1 with a precision of ±40" or greater.

In relation to FIGS. 5A to 5G, described below is a sequence of steps illustrating the functioning of the locomotion system of the crawler robot of the present invention.

Figure 5A:
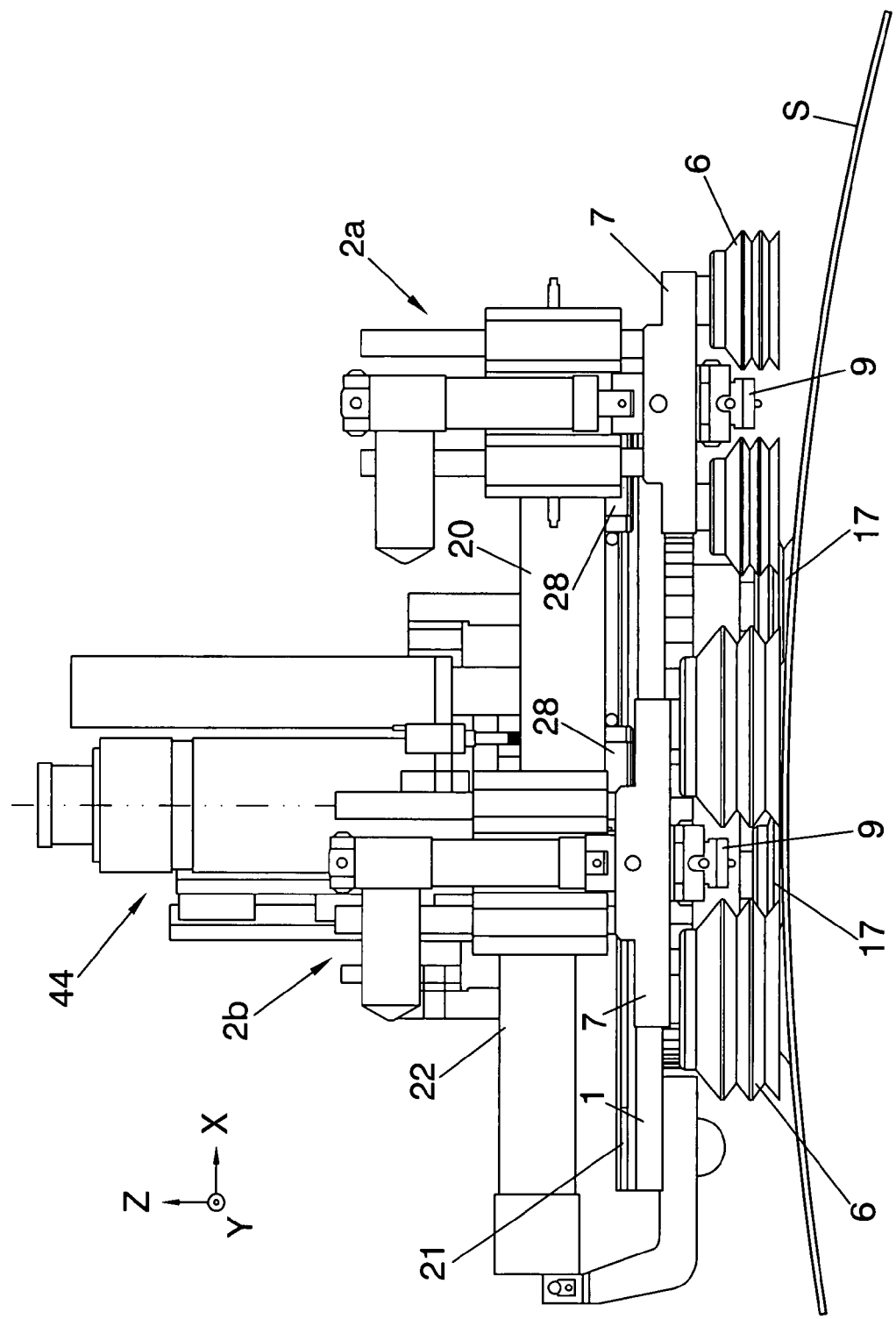

According to FIG. 5A in this example, the sequence starts with the chassis 1 immobilized by the suction pads 17 of the second suction coupling device of the second set of legs 4 coupled to the work surface 1. The front and rear legs 2a, 2b of the first set of legs 2a, 2b are retracted in such a way that the respective suction pads 6 are separated from the work surface S, and consequently the feet 9 are also separated from the work surface S.

Figure 5B:
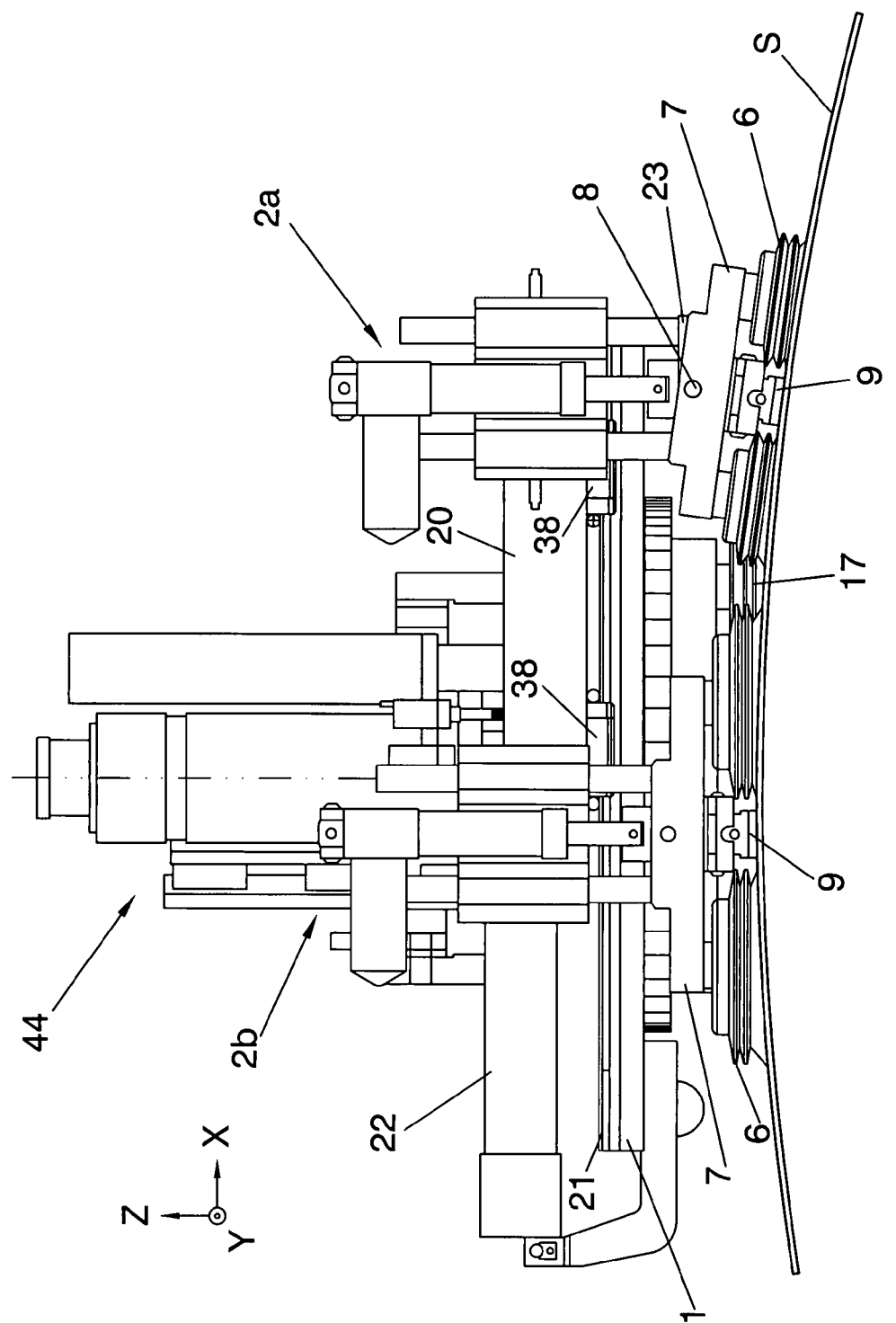

Next, the front and rear legs 2a, 2b of the first set of legs 2a, 2b are extended until the corresponding suction pads 6 make contact with the work surface, as shown in FIG. 5B, and the first suction coupling device is activated in order to couple the suction pads 6 of the front and rear legs 2a, 2b of the work surface 6 while the suction pads 17 of the second set of legs 4 remain coupled to the work surface. In this position, the feet 9 rest on the work surface. It can be seen that the tilting support 7 of the front legs 2a has freely rotated about the shaft 8 in order to adapt its position to the curvature of the work surface S.

In relation to FIG. 5C, the following step consists of deactivating the second suction coupling device of the second set of legs 4 in order to decouple the corresponding suction pads 17 of the work surface S and then extend the front and rear legs 2a, 2b of the first set of legs 2a, 2b so as to raise the chassis 1 and with it separate the suction pads 17 of the second set of legs 4 from the work surface S while the suction pads 6 of the first set of legs 2a, 2b remain coupled to the work surface S.

Figure 5D:
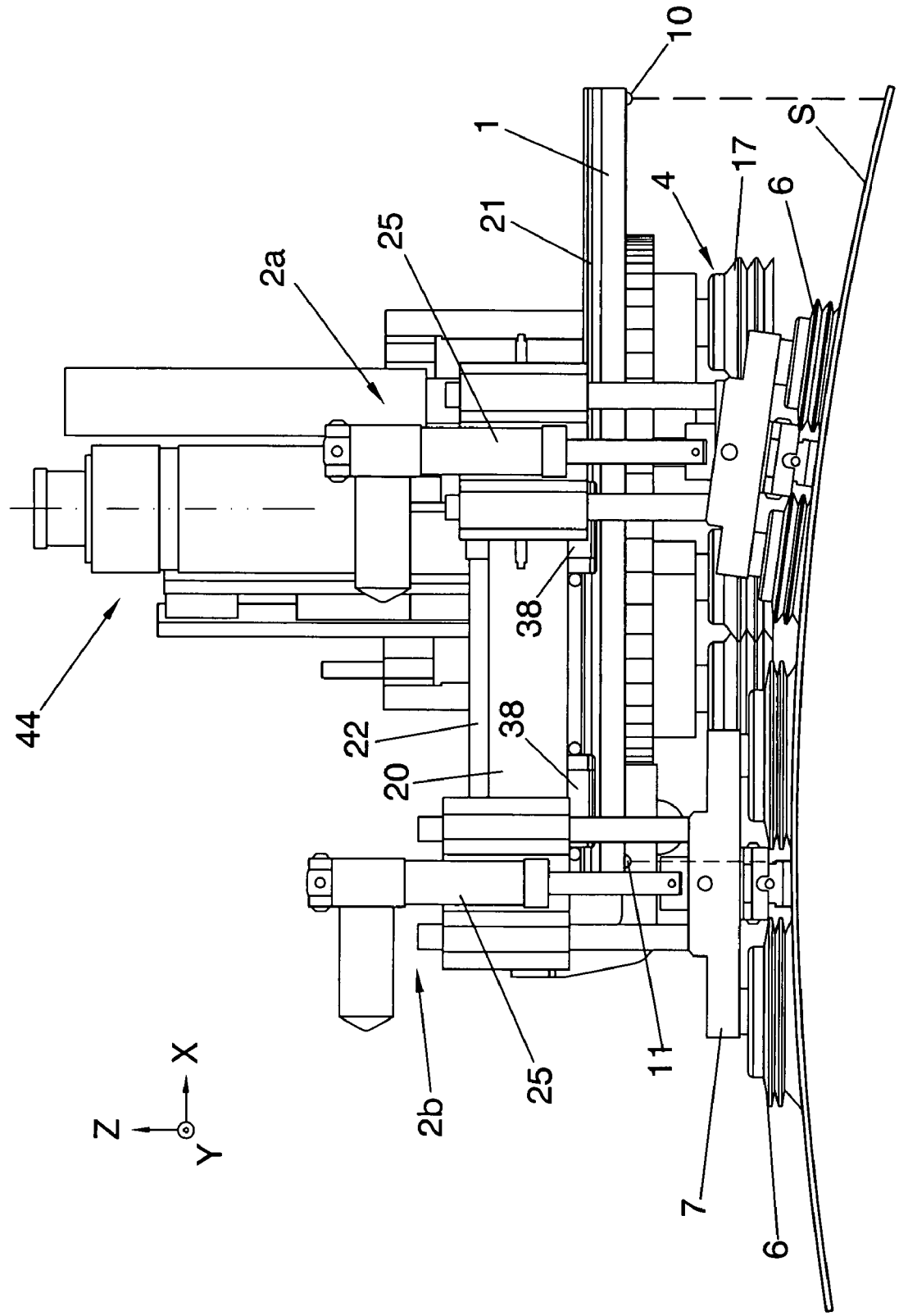

Next, as illustrated in FIG. 5D, the linear actuators are activated in order to displace the displaceable supports 20 with respect to the chassis 1 in the direction of the X axis. Owing to the fact that the suction pads 6 of the first set of legs 2a, 2b are coupled to the work surface S, the result is a displacement of the chassis 1 in relation to the displaceable supports 20 and in relation to the work surface S. In a first and second separated point of the chassis 1 are respectively arranged at least a first and a second sensor element 10, 11 adapted for detecting the distance in the direction of the Z axis from each of those first and second points of the chassis 1 to the work surface S and sending representative signals of those distances to said control means. In response to said signals received from said first and second sensor elements 10, 11, the control means are adapted for controlling the functioning of the linear actuators 25 of the second means of actuation in order to individually extend or retract each of the front and rear legs 2a, 2b by a sufficient degree for effecting a leveling of the chassis 1 in relation to the work surface S.

Figure 5E:
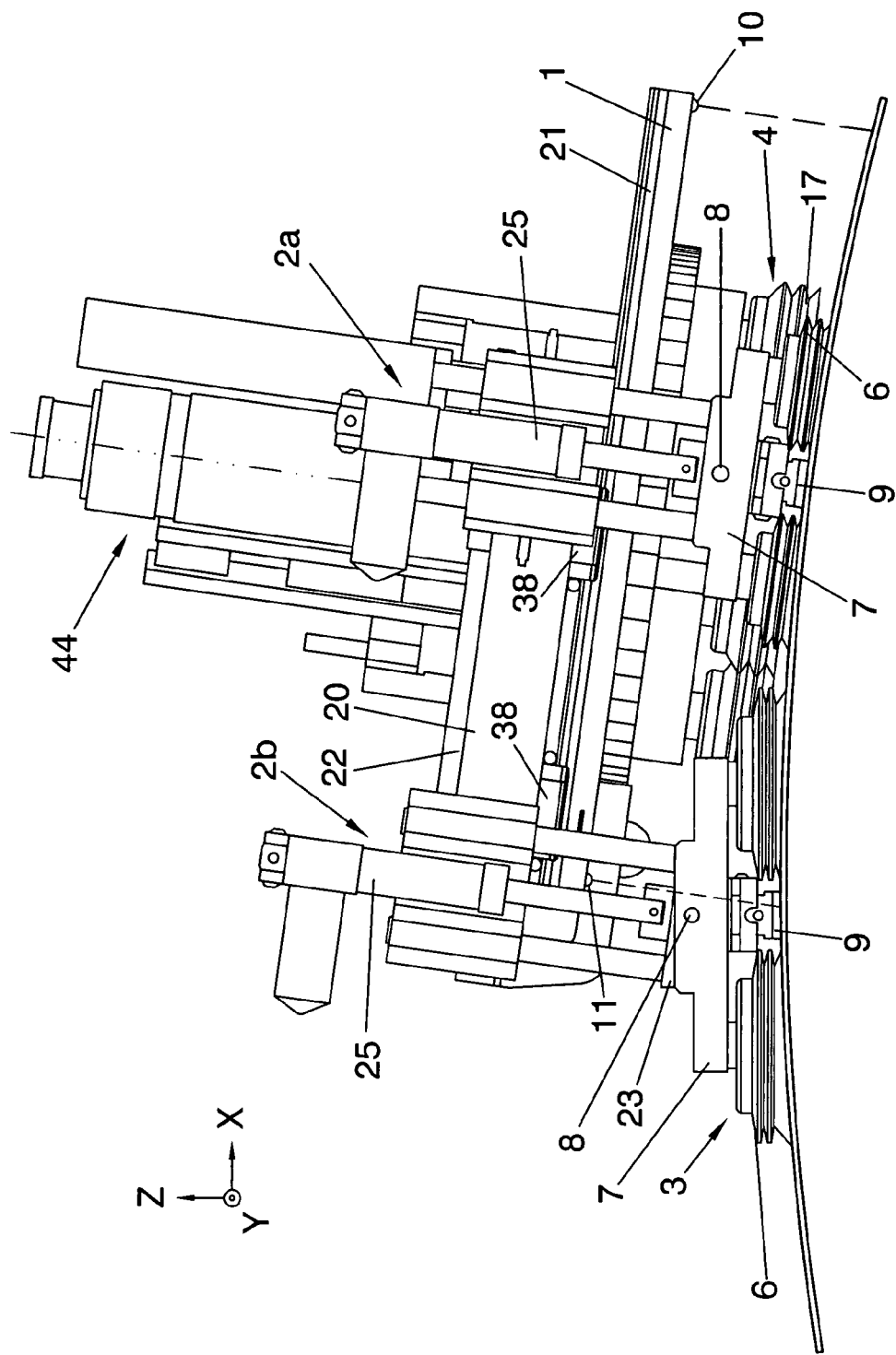

FIG. 5E shows the crawler robot with the chassis 1 in a leveled position as a result of the actuation of the linear actuators 25 in accordance with the signals received from the first and second sensor element 10, 11. In this position, and assuming that the first and second sensor elements 10, 11 are equidistant from the shaft of the head 19, the distances measured by the first and second sensor elements 10, 11 are equal and the shaft of the head 19 is in a position perpendicular to the work surface, or in other words, perpendicular to a plane tangent to the work surface S in the operating situation. If this is not the case, the distances measured by the first and second sensor elements 10, 11 must comply with a predetermined ratio in order to ensure the leveling of the chassis 1. It can be seen that the tilting supports 7 of the front and rear legs 2a, 2b have pivoted on their respective shafts 8 in order to permit leveling of the chassis. At the same time, the front legs 2a have been displaced slightly in relation to the rear legs 2b in order to accommodate a variation in the distance between the subsets of front and rear legs 2a, 2b produced as a consequence of the leveling of the chassis 1 when the suction pads 6 of the first suction coupling devices 3 are coupled to the work surface S.

Figure 5F:
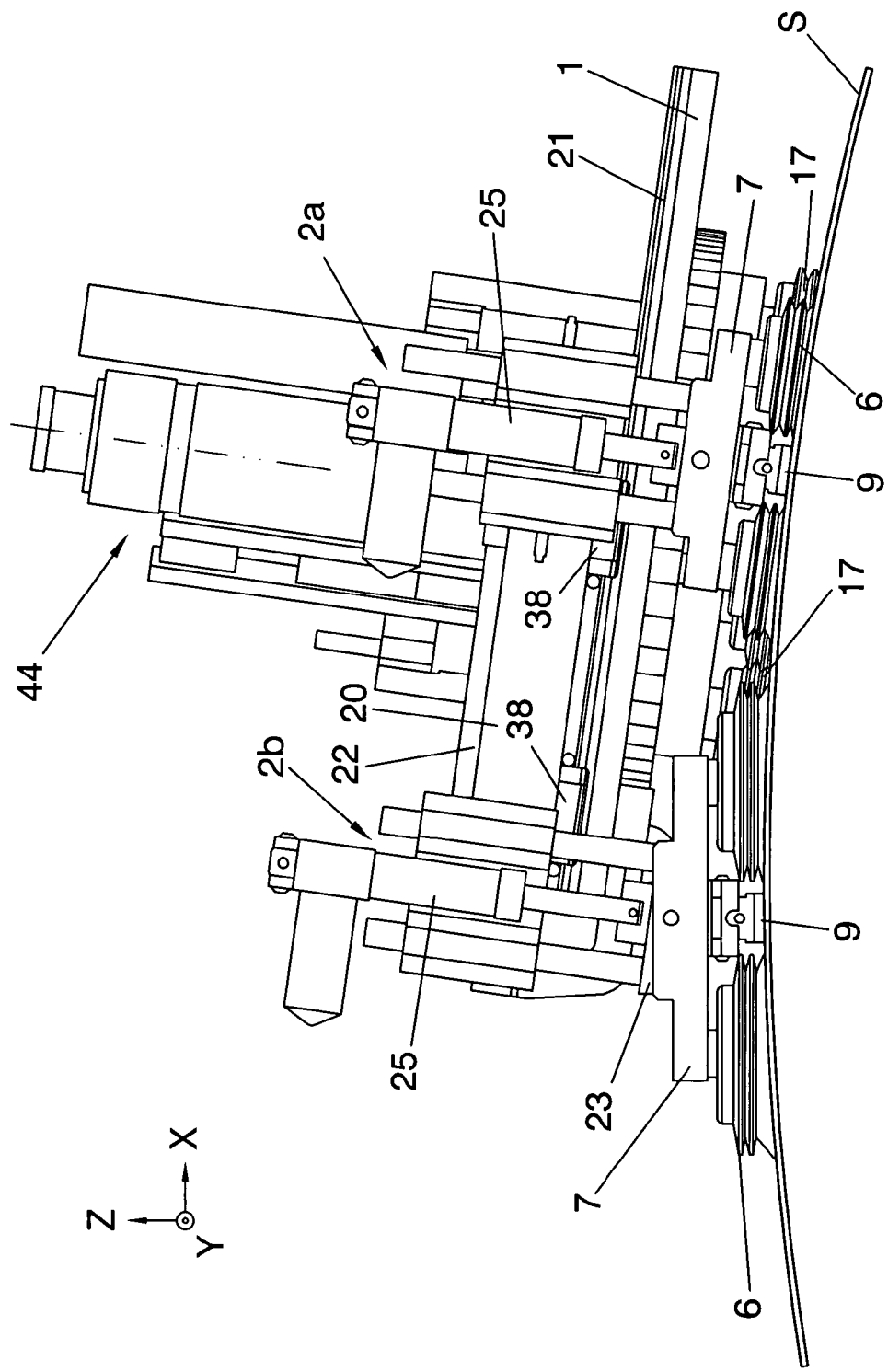

FIG. 5F illustrates the following step, which consists of actuating the linear actuators 25 in order to retract the front and rear legs 2a, 2b by equal distances until the corresponding suction pads 17 of the second set of legs 4 make contact with the work surface S and the second suction coupling device is activated in order to couple the suction pads 17 of the second set of legs 4 to the work surface while the suction pads 4 of the front and rear legs 2a, 2b remain coupled to the work surface S and maintain the chassis 1 in the previously leveled position. So, in the position shown in FIG. 5F, the feet 9 are resting on the work surface S while all the suction pads 6, 17 of the first and second set of legs 6, 17 are coupled to the work surface S, and the chassis 1 is leveled in relation to that surface S. The position shown in FIG. 5F is a suitable position so that the work unit 44 can perform one or more work operations on the work surface S and is therefore the position which the robot will adopt when it has reached a place of work as a prior step to the start of the operations.

Figure 5G:
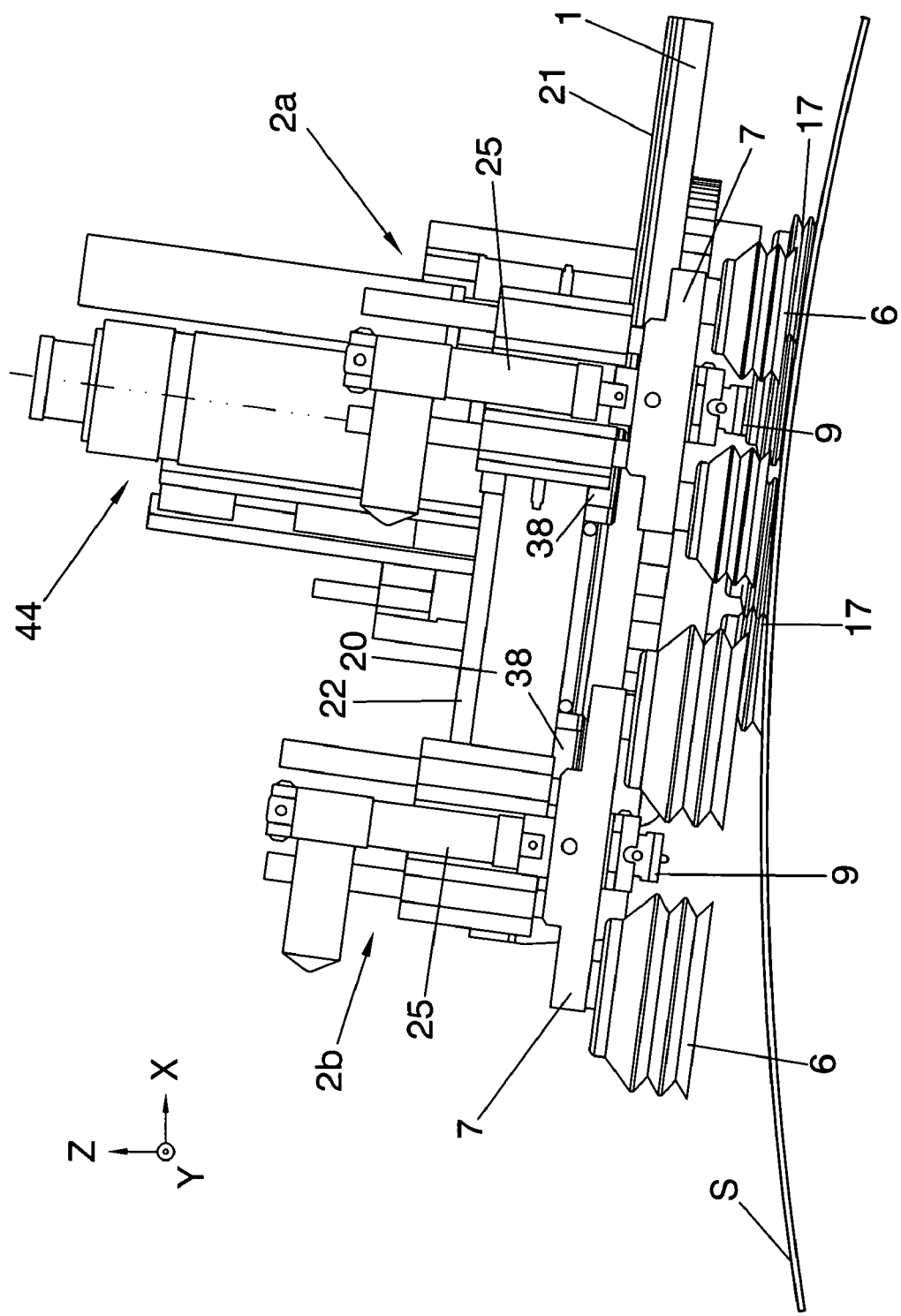

Finally, as shown in FIG. 5G, starting from the position shown in FIG. 5F the suction pads 6 of the front and rear legs 2a, 2b are deactivated and the front and rear legs 2a, 2b are retracted in order to raise the suction pads 6 from the work surface while the suction pads 17 of the second set of legs 4 remain coupled to the work surface. Starting from the position shown in FIG. 5G, an activation of the linear actuators 22 displaces the displaceable supports 20 with respect to the chassis 1 and in relation to the work surface S in the direction of the X axis until the crawler robot is located in a position equivalent to that shown in FIG. 5A, at the point of initiating a new cycle.

It has to be stated that in any of the locomotion steps described above in which there are just the suction pads 6 of the first set of legs 2a, 2b coupled to the work surface S (for example, in the positions shown in FIGS. 5C, 5D and 5E) or just the suction pads 17 of the second set of legs 4 are coupled to the work surface S (for example, in the positions shown in FIGS. 5A and 5G), the first set of legs 4 can be rotated with respect to the chassis 1 (or vice versa) by activation of the electric servomotor 27 (see FIG. 1), in such a way that the chassis 1 can be rotated in relation to the work surface S in order to make changes of course in the progress of the robot.

In another embodiment of the invention with the aim of the proposed robot being better adapted to circulating firmly on a curved work surface, with a greater degree of fixing of the suction pads thereto, certain improvements are proposed in the mechanisms for attachment of the suction pads to their respective legs, with a series of examples of embodiment of those improvements being contributed illustrated by FIGS. 8a to 10b.

For the example of embodiment illustrated by FIGS. 8a to 9b, referring to the first set of legs, whether these be the front 2a or the rear 2b, said suction pads 6 are attached in an articulated fashion to said tilting support 7 of each of said first suction coupling devices 3, in such a way that they can tilt freely and independently with respect to the tilting support 7 with at least a first degree of freedom around a first shaft 103.

Said suction pads 6 are attached in an articulated fashion to said tilting support 7 of each of said first suction coupling devices 3, in such a way that they can tilt freely and independently with respect to the tilting support 7 with also a second degree of freedom around a second shaft 102.

As can be seen in FIG. 8a to 9b, for the example of embodiment illustrated therein, said second shaft 102 is perpendicular to said first shaft 103, which is parallel to the Y axis when the suction pad 6 with which it is associated is in a non-tilting position with respect to said second shaft 102.

Each of the suction pads 6 is fixed via its upper end to a support appendage 101, part of which is located inserted in a frame 100 introduced in a cavity of said tilting support 7, and joined to said frame 100 by means of said first shaft 103, which emerges from said support piece 101 and is arranged perpendicularly and fixed via its ends to respective walls of said frame 100, in such a way that permits the tilting of the support piece 101 and, with this, the tilting of the suction pad 6, with respect to the frame 100 around the first shaft 103, with an angle β as can be seen in FIG. 9b.

Said frame 100 is attached to said tilting support 7 by means of said second shaft 102, which is arranged perpendicularly and fixed via its ends to respective walls of said tilting support 7 which demarcate said cavity, in such a way that permits the tilting of the frame 100 and, with this, the tilting of the suction pad 6, with respect to the support member 7 around the second shaft 102, with an angle γ as can be seen in FIG. 9*b*.

Continuing with FIGS. 8*a* and 8*b*, it can be seen here how the robot comprises a spring element R fixed via one end to the frame 100 and via the other to the wall demarcating the tilting support 7, in such a way that the spring element R acts against the tilting movement in one direction of the frame 100 with regard to the second shaft 102.

Figure 10B:
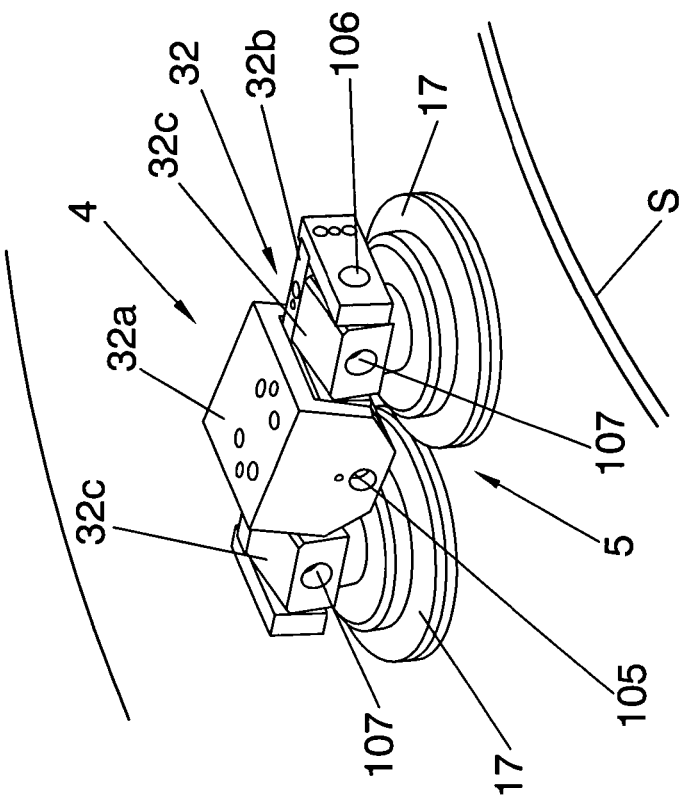
FIG. 10b is a perspective view of the second set of legs of the robot proposed by the present invention for the same example of embodiment as for FIG. 10a, in a position of coupling of the suction pads on a curved work surface.
Figure 10A:
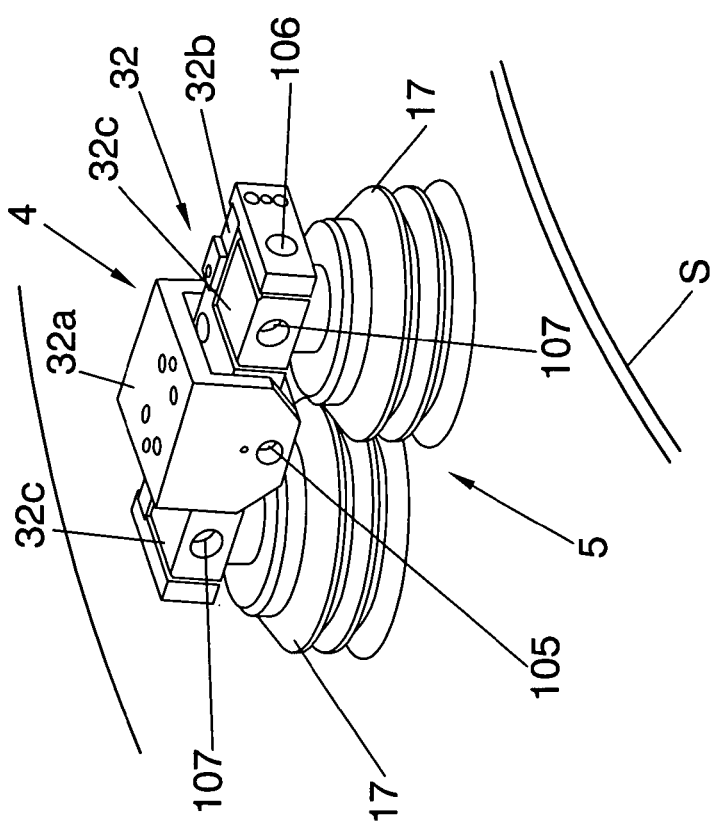
FIG. 10a is a perspective view of the second set of legs of the robot proposed by the present invention for an example of embodiment in a position of decoupling of the suction pads.

With regard to the second set of legs 4, one of them can be seen in FIGS. 10*a* and 10*b* with the stated improvements, and materialized in that said plurality of suction pads 17 of said second suction coupling devices 5 are fitted in pairs in various blocks 32 joined to said rotary annular support 18.

It can be seen in FIGS. 10*a* and 10*b* that each one of said blocks 32 consists of a first piece 32*a* firmly attached to the rotary annular support 18, and a second piece 32*b* (which for the example of embodiment illustrated traverses the first piece 32*a*) to which are attached two of those suction pads 17 and attached in an articulated fashion to said first piece 32*a*, in such a way that it can tilt freely with respect to a third shaft 105 contained in a plane parallel to that of the rotary annular support 18.

Each of the said blocks 32 comprises two third pieces 32*c*, each of them attached to an upper end of a respective suction pad 17 via their upper end, each pair of said third pieces 32*c* being attached in an articulated fashion, freely and independently with respect to the second piece 32*b*, with at least a first degree of freedom around a fourth shaft 106 perpendicular to said third shaft 105.

For one example of embodiment, each of those suction pads 17 is attached in an articulated fashion to one of the third pieces 32*c* via a fifth shaft 107 perpendicular to the fourth shaft 106.

By virtue of the systems of locomotion, leveling and guiding described above, the crawler robot of the present invention is capable of crawling over the surface of a fuselage, or part thereof, or of other parts of an aircraft in order to carry out works in different places of work in them. In order to carry out complex jobs requiring multiple operations, this invention contributes a team of specialized crawler robots where each crawler robot of the team consists of a chassis 1 provided with some systems of locomotion, leveling and guiding like those described above and where the different robots are equipped with different work units adapted for carrying out certain specific operations of a single job. The control means are adapted for governing the different robots which are consecutively sent to the same places of work on the work surface in order to perform consecutive stapes of a single job in the same operation sites.

In this specification the expression "place of work" is used in order to refer to a place of the work surface where the robot is halted and made available for working. "Operation site" is understood to be the precise point included within the place of work and in which the head carried by the robot has to perform the corresponding stage of the job. By virtue of the capacity for movement of the work unit in relation to the chassis, a single place of work can include several operation sites relatively close together.

By way of example, described below is a team of crawler robots in accordance with the present invention dedicated to one of the jobs to be carried out habitually in the aeronautical construction industry consisting of joining two or more partially superimposed panels by means of rivets, in order to form the fuselage or other parts of an aircraft. In order to carry out this work the team consists of two crawler robots. A first robot, shown in FIGS. 6 and 7, carries a first work unit 44 with a head 19 adapted for drilling, reaming and countersinking, along with a device for sucking the shavings that are generated. A second robot (not shown) carries a second work unit equipped with a head for inserting and fixing rivets in the drill-holes and a device for previously applying a sealing paste to the holes.

FIG. 6 shows the same first work unit 44, which, as described above, is mounted on the second trolley 37 by means of the support 47, runners 48 and guides 49 in such a way that it can be displaced in a direction parallel to the X, Y axes, where the shaft for pivoting around the Y axis is indicated by means of the numerical reference 50 in FIG. 6. Some corresponding electric servomotors (not shown) are provided for actuating these displacements and pivotings of the first work unit 44 under the orders of the control means. The first work unit 44 consists of a drive motor 54 coupled for actuating a head 19 adapted in order to carry a drill 55. The said drill 55 is of a known type and has different sections adapted for making a holes, reaming the internal diameter of that hole and countersinking the mouth of it in a single operation of advancing the head 19 in relation to the work surface S. The extent of the advance of the head 19 for carrying out the conical countersinking is critical, since an insufficient advance could produce a countersinking that is too small for containing the head of the rivet and an excessive advance could traverse one or both panels. In order to control the advance movement of the head, the first work unit 44 consists of a device that will be described further below.

The head 19 is associated with a suction device for shavings 56 in order to suck up the shavings produced by the said drilling, reaming and countersinking head. This suction device for shavings 56 consists of a suction chamber 57 connected to a suction apparatus 58 via a duct 59. The suction chamber 57 is mounted in a sliding fashion in the Z direction, in other words, in a direction parallel to the shaft of the head 19, and a spring 60 is provided in order to push the head 57 towards a position extended towards the work surface S. One end of the head 19 and the drill 55 are arranged inside the suction chamber 57, and the suction chamber 57 has an upper opening fitted in a sliding fashion around the head 19 and a lower opening in order to permit the passage of the drill 55. The said opening of the suction chamber 57 has a mouth 61 adapted in order to make contact with the work surface S around the operation site and thereby seal the suction chamber 57 when the head 19 makes an initial pass of the advance movement. Starting from that point, a later pass of the advance movement of the head 19 places the drill in contact with the work surface in order to make the hole, and the reaming and countersinking thereof, while the suction chamber 57 remains halted on the work surface and a support for the suction chamber is retracted against the force of the said spring 60. Obviously, the duct 59 is also retracted while the suction apparatus 58 sucks up the shavings that are generated.

The said support for the suction chamber bears a first stop 62 which is displaced in relation to a second stop 63 fixed to a support of the work unit 44 when the head 19 carries out the advance movement, and the movement of the suction chamber 57 is halted by the work surface S. The advance movement of the head 19 and consequently the penetration of the drill 55 in the work surface S is limited by the contact of the first stop 62 with the second stop 63, as shown in FIG. 7. The work unit 44 includes a distance detector (not shown) adapted for detecting a distance between the head 19 and the work surface S in the operation site and for sending a representative signal of that distance to the control means. The second stop 63 is fitted in that support for the work unit 44 in such a way that it can be displaced in the Z direction by the actuation of a servomotor 64 under the control of the control means as a function of the signal received from said distance detector in order to precisely determine the extent of the advance of the head 19 with the aim of making the drill-hole and the conical countersinking of that hole with the required depth. the work unit 44 can possibly include a device for detecting the thickness of the material to drill and/or the diameter of an existing hole.

The head for positioning and fixing of rivets which forms part of the second work unit carried out the second robot (not shown) can be a head of any known type among those used in the aeronautical construction industry for the positioning and fixing of rivets, installed in a manner similar to that described for the drilling, reaming and countersinking head in relation to FIGS. 6 and 7, in other words, provided with movements in the three axes X, Y, Z and pivoting around the X, Y axes. Also, the head for positioning and fixing of rivets can be associated with a device for controlling the advance movement based on a distance detector and a set of stops governed by the control means as a function of the signals received from the distance detector, in a manner similar to that described in relation to FIGS. 6 and 7. A store of rivets can be provided in a place away from the robot and be fitted with a feed device for supplying rivets of different types or measurements to the head for positioning and fixing of rivets via an umbilical line, in a manner that is known in the prior art.

The first robot is directed by the control means.

Obviously, the team of crawler robots of the present invention is not limited to the first and second crawler robots described above and can include any other number of crawler robots equipped with any other kind of work unit in order to perform consecutive stages of other kinds of jobs on the work surface S An expert in the subject will be capable of introducing changes and modifications to the examples of embodiment described and shown without going beyond the scope of the present invention as this is defined in the attached claims.

The invention claimed is:

1. Crawler robot equipped with a work unit of the type that comprises:
    a chassis, which on an imaginary basis is referenced with three coordinate axes X, Y, Z where the X axis is aligned with a direction of advance of said chassis and the Z axis is directed towards a work surface on which the robot is displaced;
    a first set of legs mounted in a linearly displaceable manner in the direction along the X axis with respect to the chassis and provided with a first suction coupling device adapted for intermittently coupling said first set of legs to the work surface, each leg of the first set of legs being mounted in a manner that is extensible in the direction along the Z axis towards the work surface, and retractable from it, with regard to the chassis;
    a second set of legs mounted in a rotary manner around an axis parallel to the Z axis with respect to the chassis and provided with a second suction coupling device adapted for intermittently coupling said second set of legs to the work surface;
    first and second means of activation connected to a source of suction for selectively activating said first and second suction coupling devices;
    first means of actuation for linearly displacing the first set of legs with respect to the chassis;
    second means of actuation for individually actuating a movement selected from between an extension and retraction of each leg of the first set of legs with respect to the chassis;
    third means of actuation for causing the second set of legs to rotate with respect to the chassis and
    control means adapted for controlling the functioning of said first and second means of activation and of said first, second and third means of actuation in a coordinated manner in order to displace the chassis in any direction on the work surface,
    wherein
    each of the said first suction coupling devices comprises at least two suction pads mounted on a tilting support joined in an articulated fashion to one end of the corresponding leg of the first set of legs in such a way that it can freely tilt with regard to a shaft parallel to the Y axis;
    joined to each tilting support is a foot located between said two suction pads and designed and arranged for resting on the work surface when the two suction pads are coupled to that work surface;
    at least one first and second sensor elements are respectively provided at a first and second separated points of the chassis in order to detect the distance in the direction of the Z axis from each of the said first and second points of the chassis to the work surface and to send representative signals of those distances to control means;
    fitted to the chassis is a mobile support device which supports a work unit provided with a head arranged for working on the work surface via an opening existing in the chassis, said mobile support device including means of guiding and means of actuation in order to displace at least said head in the directions along the three coordinate axes X, Y, Z and to pivot the head around two axes X, Y within the opening, wherein the opening and also said means of guiding said mobile support device are dimensioned in order to permit displacements of the head in the directions along the X, Y axes within the opening, said displacements being sufficiently large for effecting works at one or more different points of the work surface without the need to effect displacements of the chassis in relation to the work surface.

2. Robot, according to claim 1, wherein said control means are adapted for controlling the functioning of the second means of actuation according to said signals received from said first and second sensor elements in order to level out the chassis in relation to the work surface.

3. Robot, according to claim 2, wherein the first set of legs have a subset of front legs and a subset of rear legs and in that the legs of one of said front and rear subsets are mounted on respective guide devices for a linear displacement in the direction along the X axis with respect to the legs of the other of the subsets of front and rear legs, and elastic members are arranged in order to push each leg in opposite directions towards a middle zone of said guide device, said displacements of the legs being effected freely against the force of said elastic members in order to accommodate a variation in the distance between the subsets of front and rear legs produced as a consequence of said levelling of the chassis when the first suction coupling devices are activated.

4. Robot, according to claim 3, wherein the subsets of front and rear legs have two legs on each side of the chassis, the front legs and the rear legs of each side being mounted on a sliding support coupled to the chassis by means of a linear guide device in the direction of the X axis and connected to a linear actuator.

5. Robot, according to claim 4, wherein each front and rear leg of the subsets of front and rear legs comprises a mobile support to which said titling support is attached in an articulated fashion, said mobile support being coupled to the chassis by means of a linear guide device in the direction of the Z axis and connected to a linear actuator.

6. Robot, according to claim 1, wherein each of said feet is attached to the corresponding titling support by means of an articulation around a shaft parallel to the X axis.

7. Robot, according to claim 1, wherein each of the said feet is associated with a contact sensor capable of sending to the control means a signal representing the existence or not of contact between the foot and the work surface.

8. Robot, according to claim 1, wherein the second suction coupling device of the second set of legs comprises a plurality of suction pads fitted to a rotary annular support coupled to the chassis by means of a rotary guide device around the Z axis and connected to a motor, said rotary annular support and said rotary guide device having respective central openings arranged for housing in their inside the opening existing in the chassis.

9. Robot according to claim 8, wherein said plurality of suction pads of said second suction coupling devices are fitted in pairs in blocks joined to said rotary annular support.

10. Robot according to claim 9, wherein each one of said blocks comprises a first piece firmly attached to the rotary annular support, and a second piece, to which are attached two of those suction pads, being attached in an articulated fashion to said first piece, in such a way that it can tilt freely with respect to a third shaft contained in a plane parallel to that of the rotary annular support.

11. Robot according to claim 10, wherein said blocks comprises two third pieces each of them attached to an upper end of a respective suction pad via their upper end, each pair of said third pieces being attached in an articulated fashion, freely and independently with respect to the second piece, with at least a first degree of freedom around a fourth shaft perpendicular to said third shaft.

12. Robot according to claim 11, wherein each of those suction pads is attached in an articulated fashion to one of said third pieces via a fifth shaft perpendicular to said fourth shaft.

13. Robot, according to claim 1, wherein said means of actuation of the mobile support device are adapted for positioning the work axis of the head in relation to the structure with a precision of at least ±0.1 mm or greater in the directions of the X, Y, Z axes and for inclining said work axis of the head in relation to the structure with a precision of at least ±40" with respect to the Z axis.

14. Robot, according to claim 1, wherein installed in the chassis and/or in the mobile support device supporting said work unit is a detection device for marks in communication with said control means in order to follow the marks on the work surface.

15. Robot, according to claim 14, wherein installed in the chassis and/or in the mobile support device supporting said work unit is a receiver-emitter in communication with an indoor global positioning system, said receiver-emitter being adapted for sending signals representing the position of the receiver-emitter in relation to said indoor global positioning system to said control means in order to guide the displacements of the chassis on the work surface.

16. Robot, according to claim 1, wherein installed in the chassis and/or in the mobile support device supporting said work unit is a receiver-emitter in communication with an indoor global positioning system, said receiver-emitter being adapted for sending signals representing the position of the receiver-emitter in relation to said indoor global positioning system to said control means in order to guide the displacements of the chassis on the work surface.

17. Robot according to claim 1, wherein said suction pads are attached in an articulated fashion to said tilting support of each of said first suction coupling devices, so that they can tilt freely and independently with respect to the tilting support, with at least a first degree of freedom around a first shaft.

18. Robot according to claim 17, wherein said suction pads are attached in an articulated fashion to said tilting support of each of said first suction coupling devices, so that they can tilt freely and independently with respect to the tilting support, with a second degree of freedom around a second shaft.

19. Robot according to claim 18, wherein said first shaft is parallel to the Y axis, when the suction pad with which it is associated is in a non-tilting position with respect to the second shaft.

20. Robot according to claim 18, wherein said second shaft is perpendicular to the first shaft.

21. Robot according to claim 20, wherein said first shaft is parallel to the Y axis, when the suction pad with which it is associated is in a non-tilting position with respect to the second shaft.

22. Robot according to claim 17, wherein said first shaft is parallel to the Y axis, when the suction pad with which it is associated is in a non-tilting position with respect to the second shaft.

23. Robot according to claim 22, wherein each of the suction pads is fixed via its upper end to a support appendage, part of which is located inserted in a frame introduced in a cavity of said tilting support, and joined to said frame by means of said first shaft, which emerges from said support piece and is arranged perpendicularly and fixed via its ends to respective walls of said frame (100), in order to permit the tilting of the support piece and, with this, the tilting of the suction pad, with respect to the frame around the first shaft.

24. Robot according to claim 23, wherein said frame is attached to said tilting support by means of said second shaft, which is arranged perpendicularly and fixed via its ends to respective walls of said tilting support which demarcate said cavity, in such a way that permits the tilting of the frame and, with this, the tilting of the suction pad, with respect to the support member around the second shaft.

25. Robot according to claim 24, wherein it comprises at least one spring element fixed via one end to the frame and via the other to the wall demarcating the tilting support, so that said spring element can act against the tilting movement in one direction of the frame with regard to the second shaft.

\* \* \* \* \*